US011363481B1

(12) United States Patent
Feder et al.

(10) Patent No.: US 11,363,481 B1
(45) Date of Patent: Jun. 14, 2022

(54) MEASURING AND USING DISPERSION FOR USER MOBILITY ANALYTICS TO IMPROVE MANAGEMENT OF CELLULAR SYSTEMS

(71) Applicant: Spirent Communications, Inc., San Jose, CA (US)

(72) Inventors: Peretz M. Feder, Englewood, NJ (US); Sandra R. Thuel, Middletown, NJ (US); Meenal Agarwal, Marlboro, NJ (US)

(73) Assignee: Spirent Communications, Inc., San Jose, CA (US)

( * ) Notice: Subject to any disclaimer, the term of this patent is extended or adjusted under 35 U.S.C. 154(b) by 27 days.

(21) Appl. No.: 16/953,240

(22) Filed: Nov. 19, 2020

Related U.S. Application Data

(60) Provisional application No. 62/937,740, filed on Nov. 19, 2019.

(51) Int. Cl.
*H04W 4/00* (2018.01)
*H04W 24/10* (2009.01)
(Continued)

(52) U.S. Cl.
CPC ....... *H04W 24/10* (2013.01); *H04W 36/0083* (2013.01); *H04W 36/32* (2013.01); *H04W 48/18* (2013.01); *H04W 84/045* (2013.01)

(58) Field of Classification Search
CPC . H04W 24/10; H04W 36/0083; H04W 36/32; H04W 48/18; H04W 84/045
(Continued)

(56) References Cited

U.S. PATENT DOCUMENTS

2020/0329455 A1\* 10/2020 Ryu .................. H04W 68/02
2021/0219151 A1\* 7/2021 Fiorese ............. H04L 41/0823
2021/0377720 A1\* 12/2021 Wang ................ H04W 60/04

OTHER PUBLICATIONS

3GPP TS 23.288 V16.5.0 Technical Specification, 3rd Generation Partnership Project; Technical Specification Group Services and System Aspects; Procedures for the 5G System (5GS); Stage 2 (Release 16), Sep. 2020, 66 pages.
(Continued)

*Primary Examiner* — Amancio Gonzalez
(74) *Attorney, Agent, or Firm* — Haynes Beffel & Wolfeld, LLP; Ernest J. Beffel, Jr.

(57) ABSTRACT

The disclosed technology teaches dispersion analysis of individual UE devices, measuring the span of cellular locations in a 5G network over which the bulk of a user's data, voice minutes and text messaging usage take place. Dispersion analysis also measures the span of cellular locations over which the bulk of a user's transactions and failed transactions take place, providing insights into camping behavior on specific cellular locations and hot spot formation. The technology disclosed includes new collection and filtering of location data to pinpoint cellular communication challenges encountered by users as well as system improvement and remediation opportunities. Additionally, this technology enables reporting of the detected behavior and related hot spots formation analysis with identifiers of UE mobile devices involved. The technology also applies to 3G 4G and future mobile networks and can be utilized for a group of UE devices selected for analysis, by device, geography, or affinity.

22 Claims, 16 Drawing Sheets

(51) Int. Cl.
　　　*H04W 36/32*　　(2009.01)
　　　*H04W 48/18*　　(2009.01)
　　　*H04W 84/04*　　(2009.01)
　　　*H04W 36/00*　　(2009.01)

(58) Field of Classification Search
　　　USPC .......................................................... 370/328
　　　See application file for complete search history.

(56) References Cited

OTHER PUBLICATIONS

3GPP TS 23.502 V16.6.0 (Sep. 2020) 3rd Generation Partnership Project; Technical Specification Group Services and System Aspects; Procedures for the 5G System (5GS); Stage 2 (Release 16), 597 pages.
ETSI TS 123 501 V16.6.0 (Oct. 2020), Technical Specification, 5G; System architecture for the 5G System (5GS) (3GPP TS 23.501 version 16.6.0 Release 16), 450 pages.
GTI 5G Network Architecture White Paper, V1.0, , Feb. 2018, 26 pages (downloaded from http://www.gtigroup.org/Resources/rep/2018-02-22/11878.html).
3rd Generation Partnership Project; Technical Specification Group Services and System Aspects; Study on enablers for network automation for the 5G System (5GS); Phase 2 (Release 17), Section 6.30, (3GPP TR 700-91 V1.1.0 (Oct. 2020), 30 pages.

\* cited by examiner

FIG. 1 5GS Non-Roaming Service-Based Representation of Reference Architecture (Prior Art)

FIG. 2 5GS Non-Roaming Reference Point Representation of Reference Architecture (Prior Art)

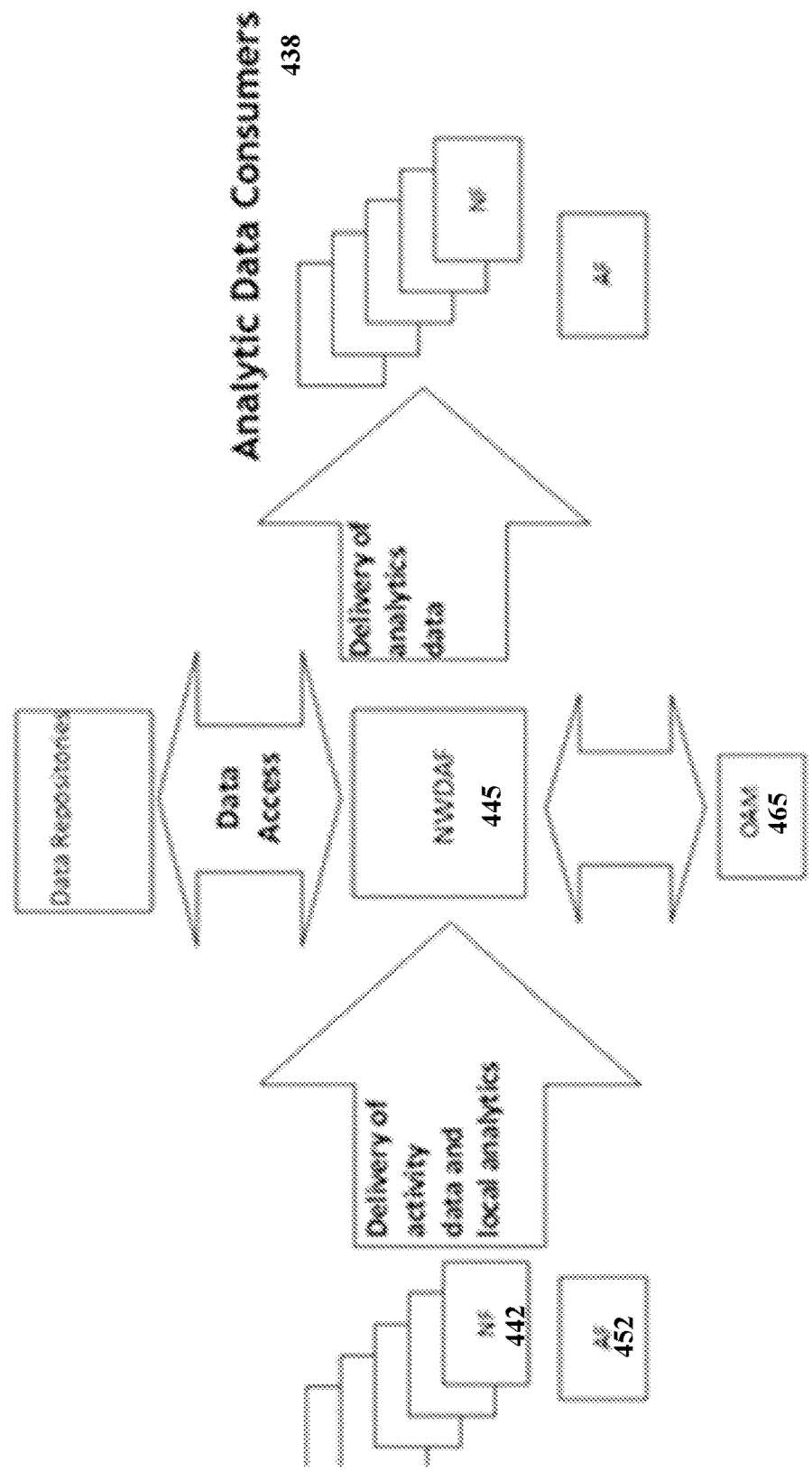
FIG. 4A   NWDAF Framework in 3GPP (TS 23.288)

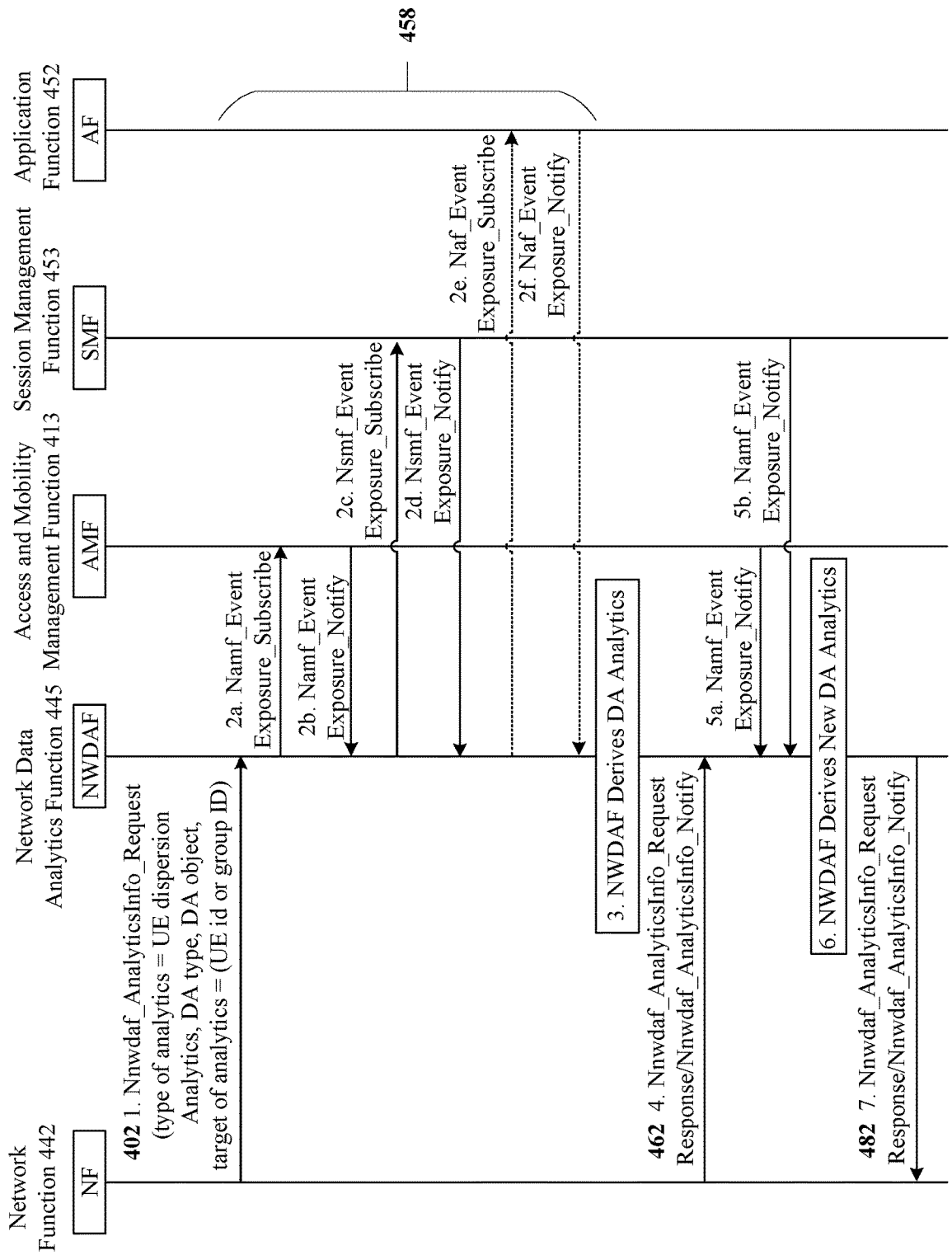
FIG. 4C UE Dispersion Analytics Provided to a NF

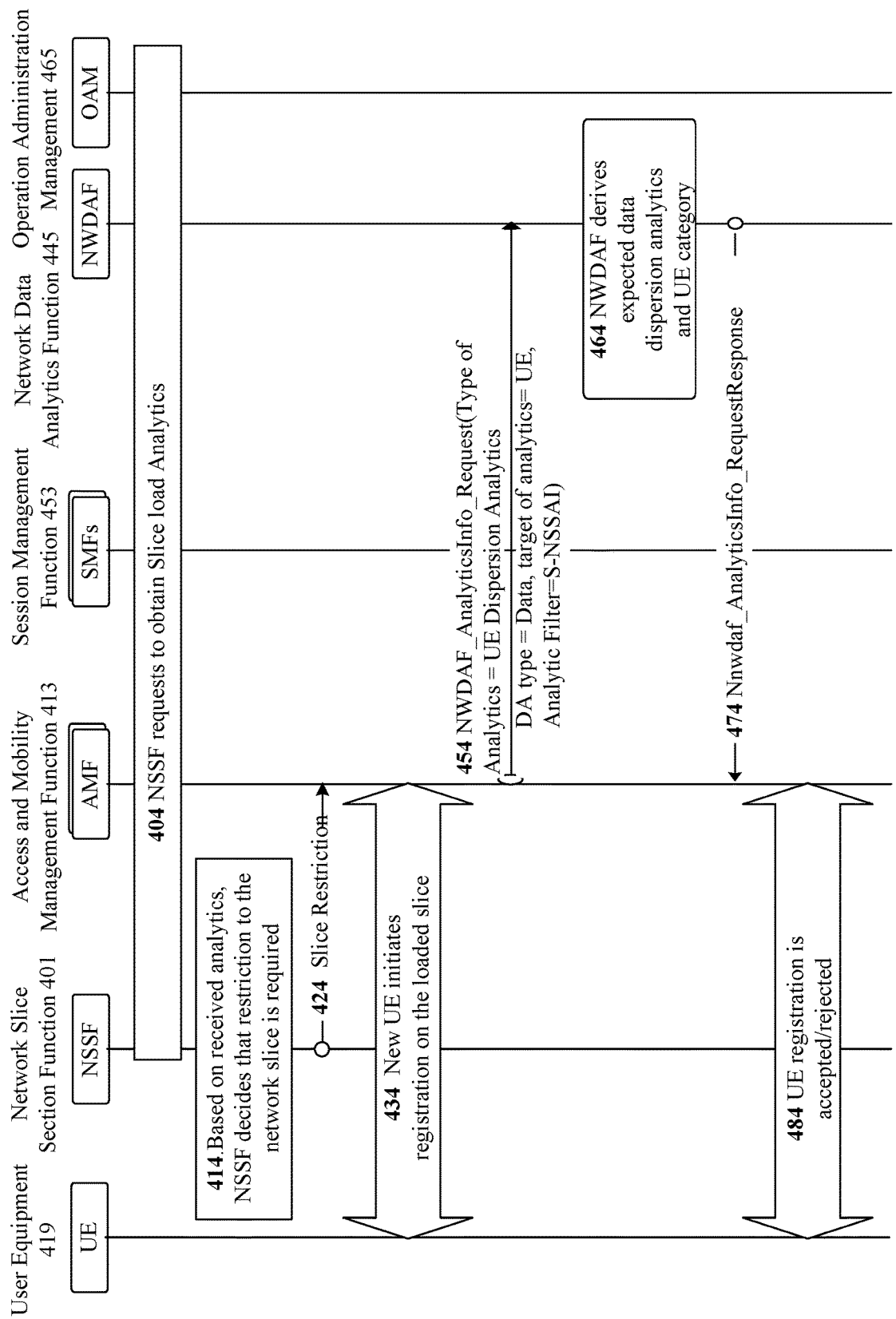
FIG. 4D Procedure for Slice Load Distribution - Accepting Registration of a new UE

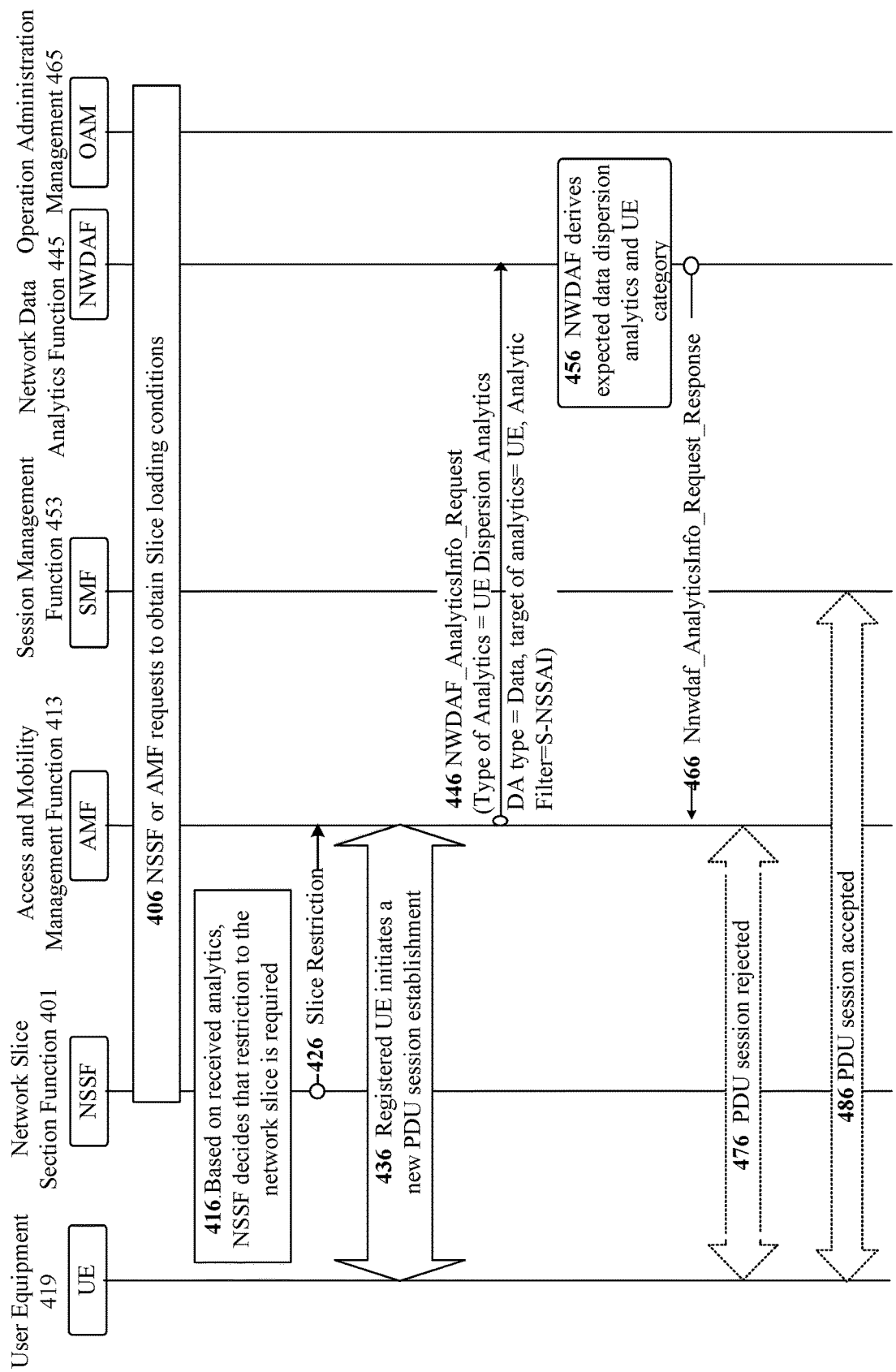
FIG. 4E Procedure for Slice Load Distribution - Accepting PDU session establishment of registered UE

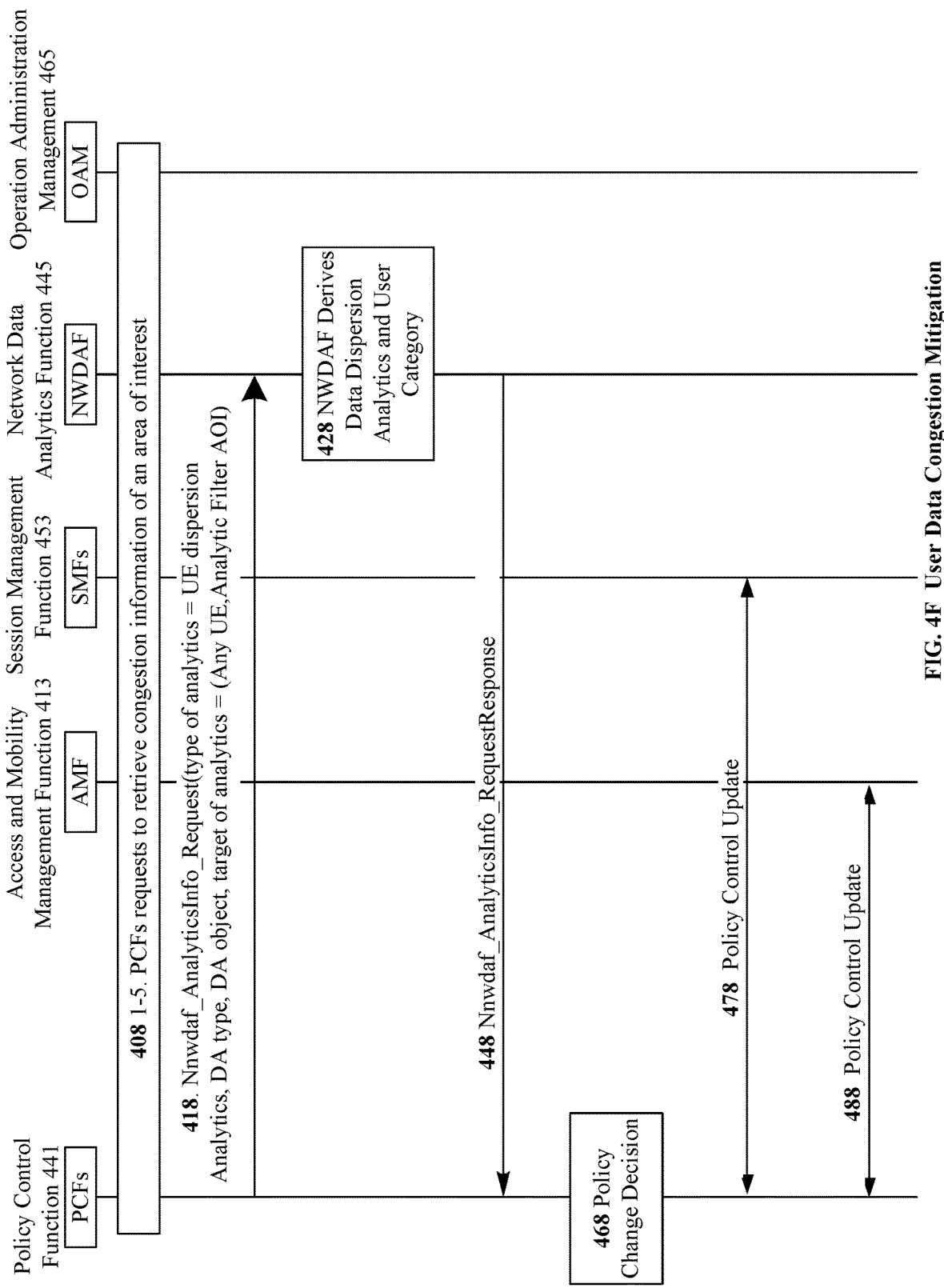
FIG. 4F User Data Congestion Mitigation

Failures & Cause Codes

| Service Type | Top Failure Caused Code | # Failures |
|---|---|---|
| data | DIAMETER 5012-Unable to comply | 1 |
| voice | MM_REJECT 17-Network failure | 1,644 |

1322 — data row
1332 — voice row

Fig. 13

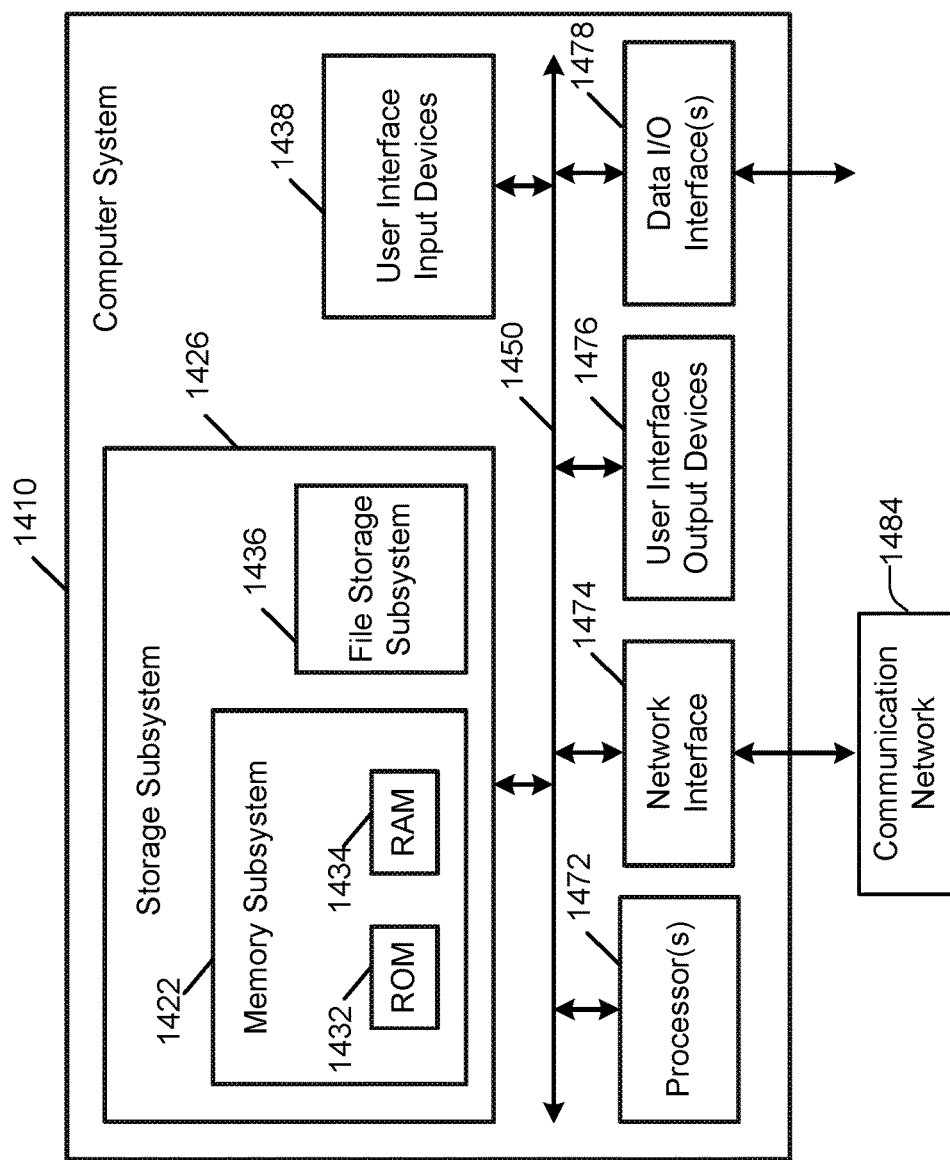
Fig. 14 Computer System

MEASURING AND USING DISPERSION FOR USER MOBILITY ANALYTICS TO IMPROVE MANAGEMENT OF CELLULAR SYSTEMS

CROSS REFERENCE

This application claims the benefit of and priority to U.S. Application No. 62/937,740, titled "Measuring and Using Dispersion for User Mobility Analytics to Improve Management of Cellular Systems", filed 19 Nov. 2019. The priority application is incorporated by references for all purposes.

This application is related to contemporaneously filed U.S. Application titled "Updating Policy and Radio Access Network Decisions Based on Dispersion Analytics of Cellular Systems", filed on 19 Nov. 2020 (Ser. No. 16/953,245). The related application is incorporated by references for all purposes.

PREVIOUSLY DISCLOSED

Part of the technology disclosed in this application was previously disclosed by applicant in 3rd Generation Partnership Project; Technical Specification Group Services and System Aspects; Study on enablers for network automation for the 5G System (5GS); Phase 2 (Release 17), Section 6.30, (3GPP TR 700-91 V1.1.0 (2020-10) which is hereby incorporated by reference and which will be submitted with an Information Disclosure Statement. This prior disclosure is identified in accordance with MPEP 2153.01(a) & 608.01(a) and 37 CFR 1.77(b)(6).

BACKGROUND

The approaching implementation of 5G will intensify the rate of digital transformation for Communications Service Providers (CSPs). 5G technology will bring more devices, more cell sites, more performance and analytic data and more configurability.

Service providers will find it useful to monitor mobile devices that utilize 5GS equipment, extending beyond infrastructure planning and management to understanding and servicing individual users. Understanding and characterizing the mobility behavior of users on wide area wireless networks has potential to improve the way that resources are managed for efficiency and troubleshooting. This potential is especially valuable to 5G networks, which enable a greater degree of user service customization including the allocation of edge resources. To address this space, the 3GPP network architecture standard group is specifying a data analytics function (NWDAF) that includes requirements for analyzing UE mobility.

An opportunity arises to provide systems and methods for collection and filtering of a new set of measurements for user equipment (UE) mobility, capturing how a UE moves around a network, how the UE interacts with the network, and analyzing the measurements to pinpoint cellular communication challenges encountered by users and to identify system improvement and remediation opportunities. The systems and methods can also extend to automating use of the collected filtered data to inform management of the network, via artificial intelligence and machine learning, in some implementations.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 4A illustrates the enabling Network Automation (eNA) framework as captured in TS 23.288 in 3GPP.

FIG. 4C illustrates call flow for an enabling network automation (eNA) framework, mirroring UE dispersion analytics provided to a network function.

FIG. 4D shows the procedure for slice load distribution, for accepting registration of new UE additions.

FIG. 4E shows the procedure for slice load distribution for accepting PDU session establishment of registered UE.

FIG. 4F illustrates a disclosed procedure for user data congestion mitigation.

FIG. 13 lists the top cause code for each service that failed and the number of failures observed for that cause code for one day, via an example dashboard for mobility and dispersion analytics for the disclosed technology.

FIG. 14 is a simplified block diagram of a computer system that can be used for quantifying mobility behavior of a mobile device user and their interactions with a serving cellular network, according to one implementation of the disclosed technology.

DETAILED DESCRIPTION

Figure 1:
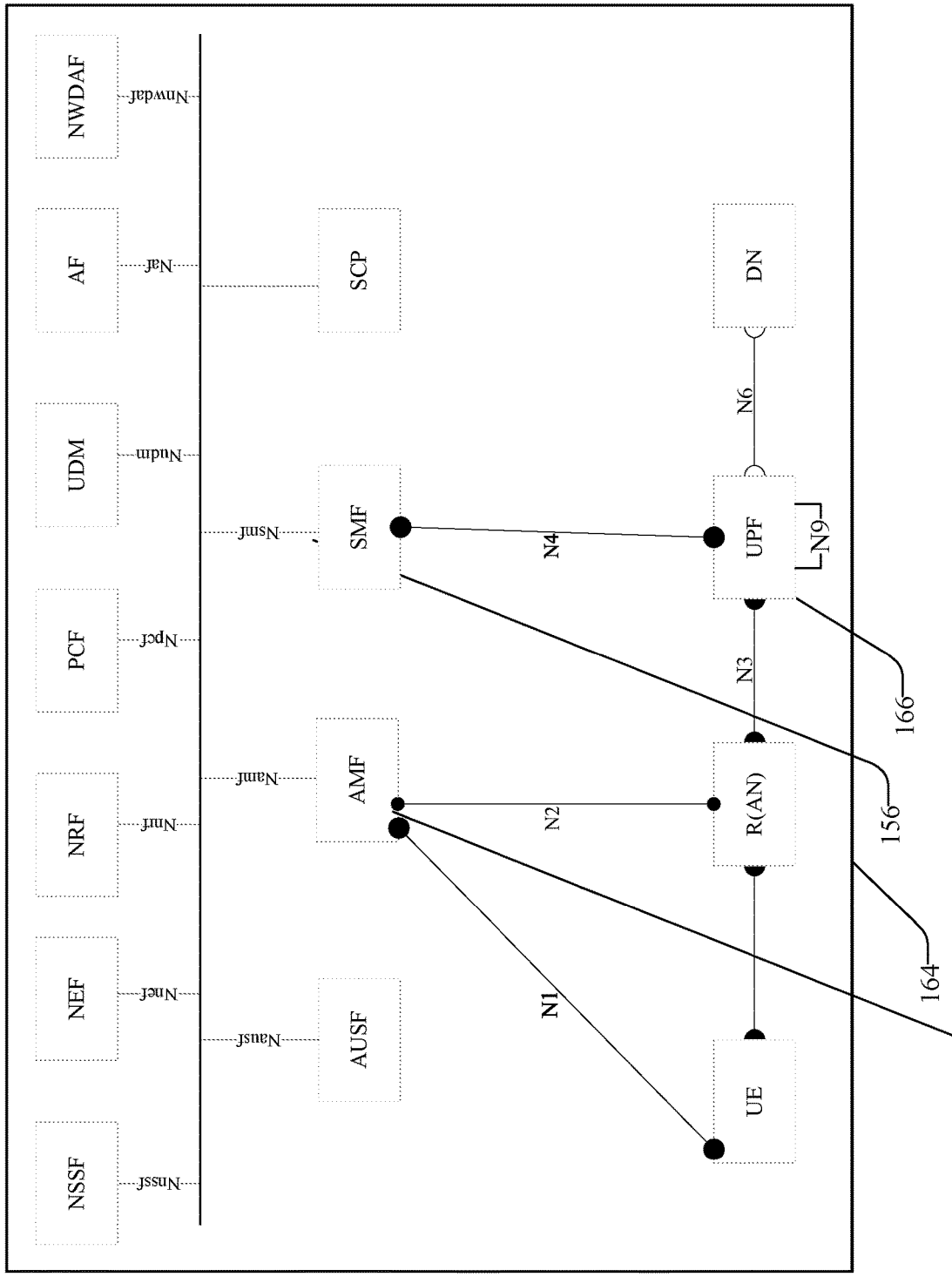
FIG. 1 shows a 5GS non-roaming service-based representation of the reference architecture in which network functions within the control plane enable other authorized network functions to access their services.

The following description of the disclosure will typically be with reference to specific embodiments and methods. It is to be understood that there is no intention to limit the disclosure to the specifically disclosed embodiments and methods, but that the disclosure may be practiced using other features, elements, methods and embodiments. Preferred embodiments are described to illustrate the present disclosure, not to limit its scope. Those of ordinary skill in the art will recognize a variety of equivalent variations on the description that follows. Like elements in various embodiments are commonly referred to with like reference numerals.

One of the objectives of the emerging 5G infrastructure is to substantially reduce data and compute latency, thereby opening up new uses of cellular data communication. New opportunities are presented for data-centric deployment of edge compute resources, relative to the cellular base stations, and for load-centric backhaul routing and provisioning of wired connections between the base stations and edge computing resources. Understanding individual user mobility and usage behavior will become a useful insight into these edge optimizations, especially when tackling the additional complexities associated with 5G slicing support.

Data centric infrastructure management requires new measures of cellular usage. Beyond traditional metrics of usage aggregated over many users, the usage pattern of individuals becomes important, especially as cellular wireless takes on data load that would otherwise be handled by Wi-Fi or cable networks (e.g., fixed broadband services) and the infrastructure uses slicing for service differentiation.

The technology disclosed involves dispersion analysis of individual users and so-called dispersion indices. That is, a measure of the number of cellular locations or touchpoints over which the user disperses the bulk of his used data and his usage of other cellular services such as voice and text messaging. Unlike statistics aggregated over many users, dispersion analysis provides insights into the camping behavior of an individual user, which means a user spending an extended time at a location. During an extended time, mobile users who typically are not fixed to one location may rely on cellular communications from a relatively fixed location, sometimes referred to as "camping" on a cell or on a cell-site. The characteristic use of cellular data communications is often different for users at work than for users in transit or at home. Dispersion can provide insights into these different behaviors. Dispersion also enables analytics of user mobility behavior of potential interest for user messaging. Its ability to expose camping locations for users opens the door for customized messages in specific geographic locations and other directed messaging opportunities.

Dispersion analysis extends beyond infrastructure planning and management to understanding and servicing individual users. The technology disclosed includes a framework for new collection and filtering of data to pinpoint cellular communication challenges encountered by users and system improvement and remediation opportunities. Disclosed dispersion analysis can also extend to automating use of the collected filtered data to inform management of the network, via artificial intelligence and machine learning, in some implementations.

It is expected that the technology disclosed will be widely used, even as a standard in 5G networks. The disclosed technology for dispersion analysis can also be utilized for 3G and 4G networks. The disclosed technology for dispersion analysis can be applied to any radio access network (RAN) with many users, including future networks under development such as 6G and later.

The disclosure that follows includes acronyms, narrative introduction to two types of dispersion indices, description of network data analytics function (NWDAF) alignment use cases, a review of 5G representational architecture, NWDAF enabling network automation, and an example message diagram for UE dispersion indices and analytics for the disclosed technology.

Acronyms

Acronyms used in this disclosure are identified the first time that they are used. These acronyms are terms of art, often used in standards documents. Except where the terms are used in a clear and distinctly different sense than they are used in the art, we adopt the meanings found in wireless standards. For the reader's convenience, many of them are listed here:

| | |
|---|---|
| 5GC | 5G Core Network |
| 5G-EIR | 5G Equipment Identity Register |
| 5GS | 5G System |
| AF | Application Function |
| AMBR | Aggregated Maximum Bitrate |
| AMF | Access and Mobility Management Function |
| AOI | Area of Interest |
| AUSF | Authentication Server Function |
| CE | Coverage Enhancement |
| DN | Data Network |
| eNA | Enabling Network Automation |
| HO | Hand Over |
| HPLMN | Home Public Land Mobile Network |
| HR | Home Routed (roaming) |
| NAMF | Service-based interface exhibited by AMF |
| NEF | Network Exposure Function |
| NF | Network Function |
| NNRF | Service-based interface exhibited by NRF |
| NPCF | Service-based interface exhibited by PCF |
| NRF | Network Repository Function |
| NSI | Network Status Indication |
| NSSF | Network Slice Section Function |
| NWDAF | Network Data Analytics Function |
| OAM | Operation, Administration, Management |
| PCF | Policy Control Function |
| PDU | Protocol Data Unit |
| PLMN | Public Land Mobile Network |
| (R)AN | (Radio) Access Network |
| RA | Registration Area |
| RAT | Radio Access Technology |
| RFSP | RAT/Frequency Selection Priority |
| SCF | Service Chaining Function |
| SCP | Secured Copy Protocol |
| SMF | Session Management Function |
| TA | Tracking Area |
| UDM | Unified Data Management |
| UDR | Unified Data Repository |
| UDSF | Unstructured Data Storage Function |
| UE | User Equipment |
| UPF | User Plane Function |

Additional information regarding 5G networks can be found in "GTI 5G Network Architecture White Paper"<accessed on Nov. 18, 2019 at http://www.gti-group.org/d/file/Resources/rep/2018-02-22/06608ce6dbe32673ac1611359e11f794.pdf>.

Two Types of Dispersion Measures

One of the standard setting bodies involved in 5G technology is the 3rd Generation Partnership Project (3GPP), a global initiative for setting mobile broadband standards, which issues Technical Specifications (TS), in collaboration with the European Telecommunications Standards Institute (ETSI). Three TS documents that describe aspects of 5G systems are: (1) ETSI TS 123 501 System Architecture for the 5G System includes the network data analytics function (NWDAF) component in the system architecture, (e.g., 3GPP TS 23.501 version 16.6.0 Release 16), referred to as 501 in this document; (2) ETSI TS 123 502 Procedures for the 5G System describes standard operating processes for the 5G system, (e.g., 3GPP TS 23.502 version 16.6.0 Release 16), referred to as 502 in this document; and (3) 3GPP TS 23.288 Architecture enhancements for 5G System (5GS) to support network data analytics services (e.g. 3GPP TS 23.288 version 16.5.0 Release 16) describes enhancements for 5GS to support network data analytics services, referred to as 288 in this document. The foregoing three documents are incorporated herein by reference in their entireties for all purposes.

The NWDAF is an analytic function with multiple analytic attributes. One of the objectives is to analyze and predict network performance, UE mobile device and group of UEs behaviors and performance. 5G standards define sophisticated requirements including predicting user mobility patterns, communication patterns and cell usage trajectory for customized edge services.

The disclosed, so-called dispersion index technology extends the capabilities of a network data analytics function (NWDAF), in communication with core network components of a cellular network, with a new set of measurements for analyzing UE mobility that hold valuable analytics potential for capturing how a UE moves around a network and how it interacts with the network. The technology disclosed measures without excessive detail how a majority of a user's activity is dispersed through different access locations in the network. The new set of measurements, referred to as dispersion indices, capture the scope and intensity of a UE's primary interaction with the network, giving insights into the locality of service usage.

UE mobility can be measured by the total number of network location touchpoints during a day or the number of cells the UE visited in a window of time, such as a day. UE presence on a cell is often determined by observing any access or service related signaling event at the cell's control plane on its behalf.

The dispersion indices disclosed go beyond presence and focus on locations where a UE conducts a significant amount of traffic. For example, a data dispersion index covers the locations on which a user has conducted a majority (e.g., 50, 60, 70 or 75 percent or more) of his data volume. Similarly, a voice dispersion index covers the locations where the user has spent the majority of his talk time. Other dispersion indices similarly measure failure locality and the locality of control plane transactions. Analysis has revealed that capturing all traffic of all UEs at all locations they visited during a day introduces substantial noise to understanding a user's experience. Focus on a majority of volume and even a fixed or quasi-fixed number of locations responsible for a majority of the dispersed volume is better than using the totality of volume and locations.

Two types of dispersion indices are distinguished. Both types measure how many locations are prominent to a UE's interaction with the network and may be used to pinpoint the identity of these locations and the intensity of the interaction observed (e.g., data volume). However, they differ in that one type measures how the bulk of a UE's activity is dispersed relative to his own total usage, while the other type counts the locations over which the UE has had a significant amount of activity relative to the typical usage of all users (i.e., network locations where the user showed heavy usage relative to say, an average user). While the first type of metrics is UE centric because it reveals prominent locations from the point of view of how the user is served, the second type is network centric, because it reveals prominent locations where the user is costly to the network. For instance, consider a UE visiting 75 locations in a day. It disperses all its data over 15 locations, with a significant volume on 7 of the locations, but only 2 of the locations accounting for the majority of the total data volume for the day. In this example, only 2 locations matter to the user from the perspective of where the bulk of his volume was dispersed but 7 locations matter from the perspective of how costly this user is to the network. Therefore, dispersion values of 7 and 2 measure the distributed cost and preferred locality of the UEs data services, respectively.

The current NWDAF UE mobility analytics (TS 23.288 section 6.7.2) call for tracking a users' arrival and sojourn time at every visited location, a requirement needed for real-time support of applications like self-driving cars. However, there are numerous analytics use cases which do not require such detail. For these cases, the number of locations of interest is usually much smaller than all the visited locations. Transit locations have less impact on a user's service quality and volume of data usage than locations where the user camps for extended periods of time. The cardinality and identity of these locations for each UE reveal important behavioral cues that can be leveraged in network and service management functions. Dispersion indices go beyond counting or knowing all visited touchpoints to focus only on locations and/or network slices where a UE or group of UEs have dispersed a significant amount of data, signaling, call drops, failures or any other activity of interest. These special locations and network slices are essentially camping points for the user. A data dispersion index counts the locations over which a UE dispersed the bulk of its data while a voice dispersion index counts the locations over which the bulk of its talk time was dispersed. Network slice dispersion index counts the network slices over which the UE dispersed most of their data volume and signaling. Other dispersion indices similarly measure transaction failure locality or the locality of control plane transactions. In a nutshell, dispersion indices capture the cardinality of significant locations and/or network slices to a UE, reveal the identity of these locations and/or network slices and give a framework for prioritizing visited locations and network slices based on how important they are to the UE's overall experience and based on the demands the UE placed on the network. The concept applies similarly to UE groups. A network slice can have the attributes of a standalone network: data usage, 5G Voice usage (with a slice for example assigned just for voice), transaction failures, transactions, campers in the sense that such users use mainly one slice only although these users may have access to multiple slices.

In addition to their analytics value, UE dispersion indices have practical implications for data management. Tracking statistics for every visited location for every UE is a costly proposition in terms of both storage and processing requirements, especially in dense networks with a large mobile subscriber base. Dispersion indices offer an alternative to trim or tier UE location storage needs for a more efficient and cost-effective management of this data.

UE locations or touchpoints refer to unique cellular network cells, cell-sectors, or cell-sector-carriers, where a cell-sector-carrier is the finest location granularity typically used for user mobility analytics.

Dispersion indices are metrics that are applicable to any type of user activity performed on the network on its behalf, on the user plane or the control plane, regardless of the activity state of the UE (that is, whether it is in active or idle mode) and of the success or failure outcome of the activity. Application of this concept to different types of user activity enables locality analytics for the activity.

In one use case, dispersion indices can be applied to finer grain locations such as highly localized geographic bins or coarser grain locations such as access gateways to which a multiplicity of cells are connected. The disclosed dispersion indices can be applied to groups of UEs, such as users belonging to an enterprise. In this case, dispersion indices may capture the collective activity of the group, toward identifying the formation of hotspots in the network handling a significant amount of activity for the group. These hotspots are preferred camping points for the group. An identified hot spot is the outcome of the analysis of camping activities at a particular location, including operator defined tracking area(s), group of cells or even perhaps just one cell. Network slice dispersion indices may capture the collective slice activity of the group, toward identifying network slices handling a significant amount of activity for the group.

In contrast to fixed IoT devices, UEs not designated as fixed devices may nevertheless tend to disperse almost all of their data in a small handful of locations (i.e., cells, cell-sites or a tracking area). Analysis of user mobility on commercial wireless networks has revealed that 2, 3 or 4 locations most often account for the majority of a user's traffic volume on a typical day. This camping UE behavior creates hot spots that may warrant added or differentiated operator infrastructure. In particular, data dispersion indices can help determine hot spot data location and the improved desired location of edge computing resources for a UE or a group of UEs. Dispersion analysis can also exploit locality information and assist in positioning UPFs in key locations that improve the User Plane routing and reduce latency. In one example for edge computing positioning, a hot spot may be identified close to the location at which medical procedure data is collected in the field. In another case, a hot spot may be located near the location where robots in a factory need to be controlled with low latency. Dispersion indices can be used to identify the hot spot locations.

UE or UE group dispersion indices are not necessarily a UE centric measure and can be used as a network centric measure. A UE, or group of UEs mobility profile may indicate N visited locations but in reality, only M<<N locations account for the bulk of the dispersed data. With this kind of network centric information, attention for data improvement efforts can be directed at the hot spot locations. Similarly, failure indices, or drop call indices can quickly help an operator focus on hot spots that cause most of the failures for a user or a group of users.

Some examples of dispersion indices, and the information these indices can provide, include the following. (1) Data dispersion indices pointing to a user's top camping cells. This can help improve UP location and edge computing placement for the user (or for a group of users or specific enterprise users) that camp in the same vicinity. (2) In the case in which a user's data dispersion index points to a single cell, the user behaves like a fixed device from the point of view of data services (though he may show greater dispersion for other services, such as voice or SMS messages). Having knowledge of all users who behave as pseudo fixed users is important to capacity planning or prioritization of failure management, especially when these users have heavy usage or are of high value to the operator. (3) Signaling dispersion indices point to a given camped cell, or area of cells, with many users. This can reveal signaling congestion areas which may point to a NF/NFs bottleneck. (4) Failure dispersion indices point to a given cell, or area of cells, with clusters of persistently failing users. This reveals failing hot spot(s), which may point to network function issues. (5) High dropped calls dispersion indices point to a given cell, or area of cells, with many voice impacted users. This reveals failing hot spot(s), which may point to network function issues.

The various dispersion indices can be provided to some network functions so that they can take proper action. Examples of actions include (1) assisting PCF to derive different policies to UEs located at hot spot locations; (2) assisting AMF to apply different signaling parameters and steer away subscribers from hot spots or direct autonomous vehicle(s) away from failing hot spots (i.e. hot spots with a high number of failing campers); (3) assisting the steering of UP traffic to UPF(s) that better serve hot spot location and the placement of edge computing at the same location; and 4) assisting the NSSF and AMF to select an improved set of network slice or slice instances serving the UE or group of UEs.

5GS Architecture and Message Diagram for Dispersion Analytics

The technology disclosed for dispersion analytics can illustrate which users are driving network activity in a particular area of interest, are key usage drivers and are most impacted when a service-impacting incident hits a location where the user typically camps. In one use case, UP improvement can benefit from dispersion analytics, creating a new type of outputs in addition to present network performance analysis. The NWDAF can collect data that is determined to be needed for providing dispersion analytics usable for UP improvement.

Figure 2:
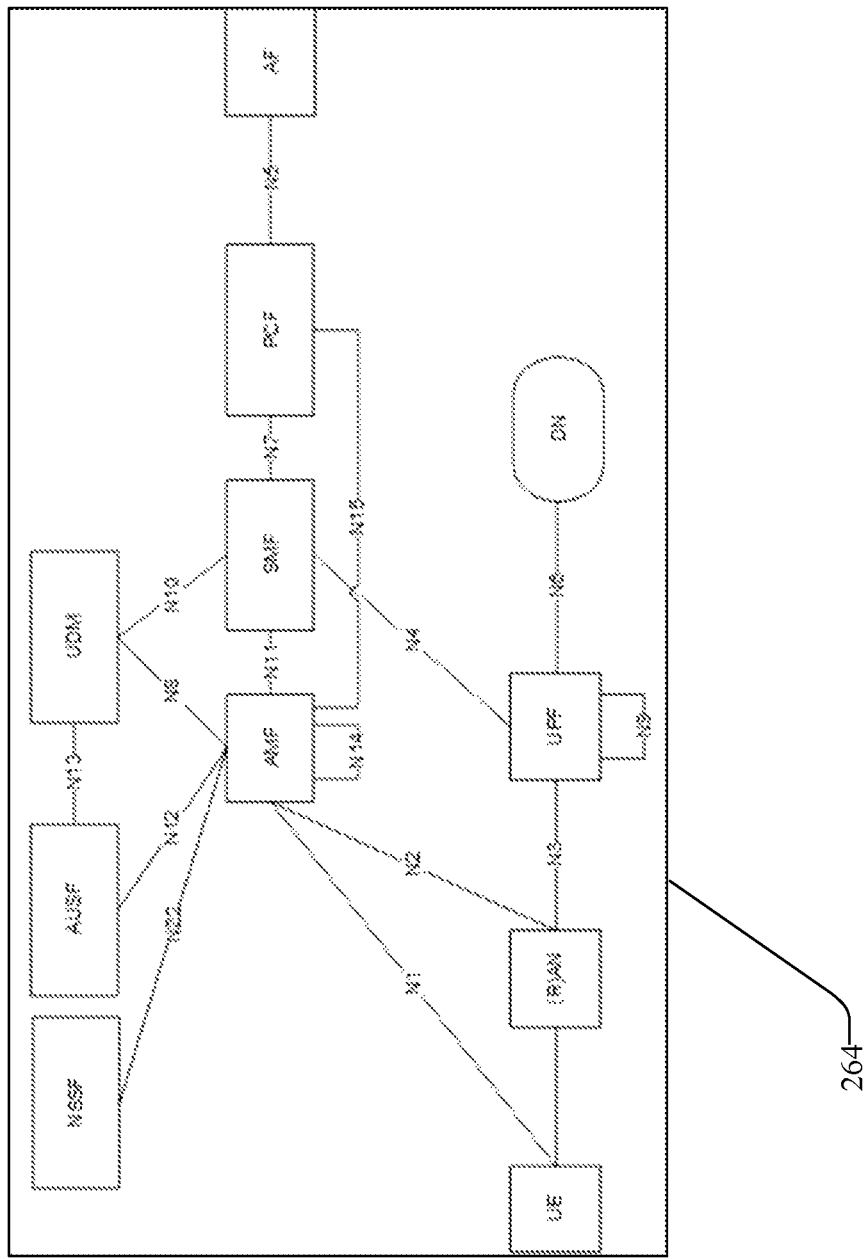
FIG. 2 depicts the 5GS non-roaming reference point representation of the reference architecture—showing how various network functions interact with each other.

ETSI TS 123 501 describes the 5GS architecture, in the non-roaming case, relative to FIG. 4.2.3-1 reproduced as FIG. 1 and FIG. 4.2.3-2 reproduced as FIG. 2. The 5GS architecture depicts a system usable for detecting behavior of a user equipment (UE) mobile device or group of UE mobile devices. FIG. 1 shows a 5GS non-roaming service-based representation of reference architecture 164 where network functions within the control plane enable other authorized network functions to access their services. If a secured copy protocol (SCP) is deployed it can be used for indirect communication between NFs and NF services. SCP does not expose services itself. The 5G Session Management Function (SMF) and Access and Mobility Function (AMF) are fundamental elements of the 5G Service-Based Architecture (SBA). The SMF 156 is primarily responsible for interacting with the decoupled data plane, creating updating and removing Protocol Data Unit (PDU) sessions and managing session context with the User Plane Function (UPF) 166. The AMF 176 is primarily responsible for receiving all connection and session related information from the User Equipment (UE) and handling connection and mobility management tasks. The AMF may subscribe to mobility events as described in 502 sub-clause 5.2.2.3.1, where location change of a UE at a cell id may be reported. The 5GS architecture allows NWDAF to collect data from a NF, such as AMF, SMF, UPF. The NWDAF belongs to the same PLMN where the network function that notifies the data is located. The 5GS architecture allows NWDAF to retrieve the management data from OAM by invoking the existing OAM services, where OAM includes a set of tools, performance measurements and fault measurements for operations, administration and management that have been used to provide network fault indication, performance information, fault localization, data and diagnosis functions. Network Slice Section Function (NSSF) consumes NWDAF analytics for slice management.

FIG. 2 depicts the 5GS non-roaming reference point representation of reference architecture 264—showing how various network functions interact with each other. For clarity, the NWDAF and its connections with other NFs, such as PCF, are not depicted in the point-to-point diagram. TS 23.288, listed earlier, includes further information on network data analytics architecture.

Multiple PDU session application of the 5GS architecture is described relative to ETSI TS 123 501 FIG. 4.2.3-3, not reproduced herein, which depicts applying non-roaming 5GS architecture for a multiple PDU session in reference point representation. FIG. 4.2.3-4, not reproduced herein, shows concurrent access to two data networks as a single PDU option. The described architecture allows the NWDAF to collect data from any NF. The NWDAF can belong to the same PLMN where the NF that notifies the data is located, but need not.

TS 23.288 includes specification that the NWDAF is to provide UE mobility related analytics in the form of statistical observation, or mobility predictions, or both to another NF or AF. The analytic aspect can be related to mobility statistics and prediction or communication statistics and prediction as defined in 23.288.

AMF can report UE presence in an Area of Interest, reporting usage via "UE mobility event notification" service, as described in ETSI TS 123 501 clause 5.3.4.4. Upon reception of a notification from AMF, the SMF determines how to deal with the PDU Session, e.g. reallocate UPF. When a PDU Session is established or modified, or when the user plane path has been changed, such as UPF re-allocation/addition/removal, SMF may provide an identifier for an Area of Interest, for example based on UPF Service Area, subscription by PCF for reporting UE presence in Presence Reporting Area. For 3GPP access, the Area of Interest constitutes a list of Tracking Areas and/or cell identifiers and/or NG-RAN node identifiers and/or Presence Reporting Area ID(s) and optionally the elements for one or more of the Presence Reporting Areas, i.e. TAs and/or NG-RAN nodes and/or cells identifiers and/or LADN DNN.

Figure 3:
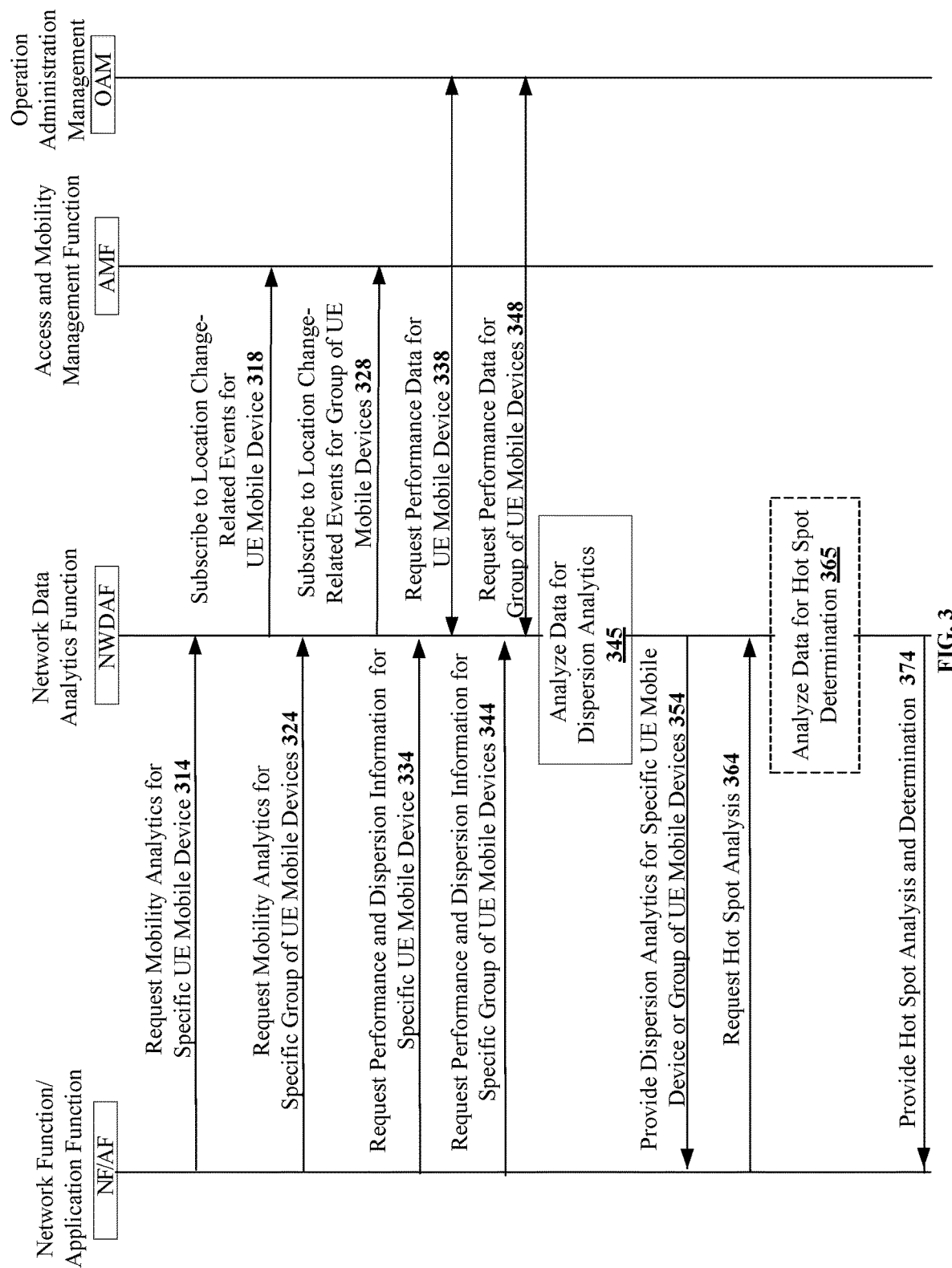
FIG. 3 shows an example message diagram of UE mobility and dispersion analytics for the disclosed technology for quantifying the mobility behavior of a mobile device user and their interactions with a serving cellular network.

FIG. 3 shows an example message diagram of UE dispersion indices and analytics for the disclosed technology. In the first step 314, the NF or AF sends a request to the NWDAF for mobility analytics on a specific UE 314 or a group of UEs 324, using service core network components of the cellular network. The NF or AF can request statistics or predictions or both. The network operator can set the type of analytics to UE mobility information. The NF or AF provides the UE mobile device identifier or Internal Group ID which is the target for analytics. The NF and AF may subscribe to a single NWDAF report or continuous notification of UE mobility analytics. Once the request is authorized, if not already containing the required analytical information, the NWDAF may subscribe to events for a single UE mobile device 318 or for a group of UE mobile devices 328, with all the serving AMFs for notification of location related-event changes.

Continuing the description of the message diagram of FIG. 3, in a separate step, the NF or AF sends a request to the NWDAF for performance data on a specific UE 334 or a group of UEs 344 or all UEs in a given location, using service core network components of the cellular network. The NF or AF can request data volume per user, in one example. The network operator can set the type of analytics to UE performance information. The NF or AF provides the UE mobile device identifier or Internal Group ID which is the target for analytics. The NF and AF may subscribe to a single NWDAF report or continuous notification of UE mobility analytics. Once the request is authorized, if not already containing the required performance information, the NWDAF may request performance data for a single UE mobile device 338 or for a group of UE mobile devices 348, with all the serving OAMs for notification of performance data. The NWDAF analyzes data for dispersion analytics 345 and provides dispersion analytics for specific UE mobile device or group of UE mobile devices 354 to the requesting NF or AF, to report the detected performance and dispersion analytics with an identifier of the UE mobile device or group of devices ID. NF or AF requests hot spot analysis 364. Alternatively, at an earlier step 344, the NF or AF may have subscribed to receive notifications for hot spots. The NWDAF analyzes data for hot spot determination 365 and provides the hot spot determination of existing hotspots per UE interaction with the network, to the requesting NF or AF 374.

FIG. 4A illustrates the enabling Network Automation (eNA) framework as captured in TS 23.288 in 3GPP. NWDAF 445 collects its data from OAM entities 465 and NFs 442 and AFs 452. Per a request from a consumer, the NWDAF 445 collects input data from network functions 442 such as AMF, SMF, NSSF, UPF, UDM and PCF, application functions (AF) 452 and also from OAM system 465. NWDAF 445 performs analysis based on various requests and then provides output to requesting analytic data consumers 438. The consumer can be NF(s) 442, AF(s) 452, and the OAM system 465. An enabled NWDAF 445 may collect data on its own to build its own model before receiving a request, so it can provide the data quickly.

Figure 4B:
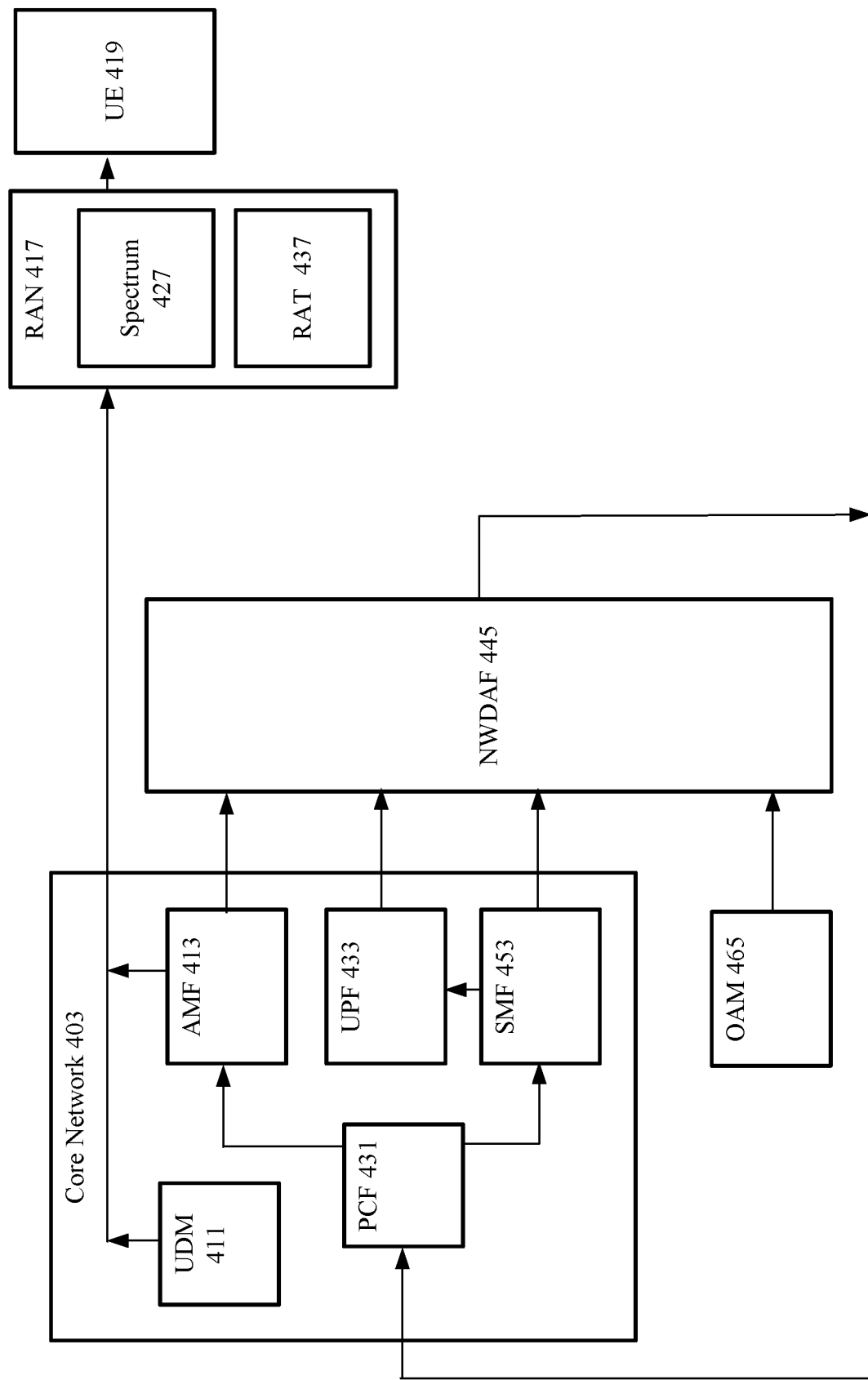
FIG. 4B shows a block diagram of the disclosed enabling Network Automation (eNA) framework.

FIG. 4B shows a block diagram of an enabling Network Automation (eNA) framework. Inputs into network data analytics function (NWDAF) 445 from core network 403 come from access and mobility function (AMF) 413, user plane function (UPF) 433 and session management function (SMF) 453 with subscribed network function (NF) output, subscribed by NWDAF 445. Input into NWDAF 445 from operation, administration, management (OAM) 465 is management reports, also subscribed by NWDAF 445. Analytics output from NWDAF 445 goes into the policy decision maker, policy control function (PCF) 431 which updates the AMF and SMF policies. The policy update also goes from AMF 413 to the radio access network (RAN) 417 and to user equipment (UE) 419 over the 3GPP interface N2. RAN 417 decision updates can be spectrum 427 assignment and/or Radio Access Technology (RAT) 437 assignment and area restriction. When a UE session initially starts, the UE configuration comes from unified data management (UDM) 411. As part of the closed loop, the configuration can be updated by PCF 413 through AMF 413. Policy updates from AMF 413, as originated at PCF 413, can include slice or slice instance selection, restricting area of service, and changing or removing QoS attributes (such as the user equipment aggregated maximum bitrate (UE-AMBR) for an ongoing session.

Dispersion Analytics Output Provided by NWDAF

Dispersion analytics characterize the interaction of a user, or a group of users, with the network and identifies at what locations (i.e. area of interest, TAs, cell) users dispersed most (if not all) their data volume, sessions transactions (i.e. MM and SM messages), transaction failures, dropped sessions and voice call minutes. Same concept applies to dispersion at a given network slice; at which slice users dispersed most (if not all) their data, session transactions, transaction failures, dropped sessions and voice call minutes.

As part of the characterization, a user or a group of users, are evaluated and classified as either fixed users, campers or travellers at the area of interest (AOI). This classification is determined per operator's defined thresholds. For example, if a user disperses, during the period of observation, most (threshold=95%) of his/her data volume at a location, the dispersion data classification of the user is fixed for that location. Likewise, different thresholds are defined for campers and travellers categories at the location.

When the network status indication (NSI) of a location is determined as being congested, as described in TS 23.288 clause 6.8, the PCF can use the dispersion analytics output to determine the fixed heavy users and top campers at the location and update policy decisions, e.g. modifying RFSP for the fixed users and top campers, thereby reducing congestion at that location.

When an AOI is exhibiting multiple transaction failures, dropped sessions and radio link failures, which could be the result of poor coverage, the AMF may allow the use of CE (Coverage Enhancement) in the affected location as described in TS 23.288 clause 6.7.5.3.

Based on collected dispersion information, the NWDAF may generate analytics to identify expected changes in transaction signal loading conditions at an area of interest such as TAs and Registration Areas. Accordingly, various loading factors can be assigned to AMF instances to avoid or mitigate predicted overload conditions.

Dispersion Definitions

Dispersion—The percentage of activity that a user, or group of users, generated at a location during a period of interest. This enables the operator to rank hot locations by the various activities and identify the top contributors (users) for that activity. When heavy users at a particular location are detected, their QoS attributes, or access to an area of interest or a slice can be limited by the PCF, AMF and NSSF.

Data dispersion—The percentage of data traffic volume that a user, or a group of users, generated at the location during the period of interest.

Transaction dispersion—The percentage of MM and SM messages that a user, or a group of users, generated at the location during the period of interest.

Transaction Failure dispersion—The percentage of failed transactions (MM and SM procedures) that a user, or a group of users, experienced at the location during the period of interest.

Dropped Sessions—The percentage of dropped sessions that a user, or a group of users, experienced at the location during the period of interest.

Voice Call dispersion—The percentage of voice call minutes a user, or a group of users, used at the location during the period of interest.

Dispersion Classification—Assignment of one of three mobility classes (i.e. fixed, camper, traveller) per dispersion characteristic:

Data-Classifications—fixed, camper, traveller data-classification per thresholds assigned by the operator. Example: when a user disperses, during the period of observation, most (threshold=95%) of his/her data at a location, the dispersion data-classification of the user at that location is fixed.

Transaction-Classifications—fixed, camper, traveller transactions-classifications per thresholds assigned by the operator. Example: when a user disperses, during the period of observation, (threshold=) 40% of his/her session transactions at a location, the dispersion transaction-classification of the user is camper at that location.

Transaction-Failure-Classifications: fixed, camper, traveller transaction-failure-classification per thresholds assigned by the operator.

Dropped-Call-Classifications—fixed, camper, traveller dropped-calls-classification per thresholds assigned by the operator.

Voice-Call-Classifications—fixed, camper, traveller voice-call-classification per thresholds assigned by the operator. Example: when a user disperses, during the period of observation, no more than (threshold=) 10% of his/her voice talk time (in minutes) at a location, the dispersion voice-call-classification of the user is traveler for the location.

A NWDAF supporting dispersion analytics statistics or predictions can collect UE dispersion related information from NFs and perform analytics to provide dispersion statistics or predictions. Through dispersion analytics, the NWDAF can determine that a data hot spot is formed when the amount of data dispersed by most of the users at the area of interest exceeds a certain data volume threshold established through statistical trending or operator policy. Likewise, the NWDAF can determine that transaction hot spot is formed when the amount of transactions dispersed by heavy users at the area of interest exceeds a certain threshold established through statistical trending or operator policy. Rouge devices generating excessive signalling in an area of interest can be identified by the NWDAF when a signalling storm is detected.

The service consumer may be a network function (NF) such as access and mobility management function (AMF) or policy control function (PCF).

The consumer of dispersion analytics may indicate in its request:

Analytics ID set to "UE Dispersion Analytics" and the dispersion analytic type (i.e. DA Type)

The Target of analytics reporting which is a single UE, any UE, or a group of UEs.

Analytics Filter Information optional list of TA(s), Area(s) of Interest, Cells, or S-NSSAI.

An Analytics target period indicating the time period over which the statistics or predictions are requested.

In a subscription, the Notification Correlation Id and the Notification Target Address.

Care must be taken with regards to load when requesting any UE at an area of interest or a slice. This could be achieved via utilization of some event filters (e.g. Area of Interest for AMF) and possible analytic filters (e.g. top-heavy users or fixed campers) and/or Analytics Reporting Information (e.g. max SUPIs), or sampling ratio as part of Event Reporting Information.

Input Data

The NWDAF supporting dispersion analytics shall be able to collect UE dispersion information from NF(s) and AFs. The detailed information collected by the NWDAF could be network data from 5GC including NFs and AFs:

Network data related to UE dispersion from 5GC as defined in the Tables A and B.

TABLE A

UE dispersion information bound by location collected from NF(s)

| Information | Source | Description |
|---|---|---|
| UE ID | AMF | SUPI |
| Type Allocation Code | AMF | Terminal model and vendor information of the UE. |
| UE locations (1..max) | AMF | UE positions |
| > UE location | | Area of Interest (TA or cells that the UE enters) |
| > Timestamp | | A time stamp when the AMF detects the UE enters this location |
| > Application ID (1..max) | AF/ UPF | To identify the application for the UE |
| >> Data Volume | AF/ UPF | amount of UE data volume exchanged per application, if application ID is provided in the Analytics request. This parameter is only available when subscriptions with periodic notification is requested |
| > Transactions | SMF, AMF | Either per UE transaction or optionally if subscription with periodic notification is requested an amount of UE transactions exchanged at the location. |
| >> Application duration | AF/ UPF | (Duration for the application (e.g. Voice talk time) |
| > Failed transaction count | SMF, AMF | Either per UE transaction or optionally if subscription with periodic notification is requested an amount of failed UE transactions at the location |
| > Dropped sessions | SMF | Either per UE transaction or optionally if subscription with periodic notification is requested an amount of UE dropped (e.g. timed out) PDU sessions |

Slice data related to UE dispersion from NF(s) as defined in the Table B

TABLE B

UE dispersion information bound by slice collected from 5GC

| Information | Source | Description |
|---|---|---|
| UE ID | AMF | SUPI |
| Type Allocation Code | AMF | Terminal model and vendor information of the UE |
| Slice (1..max) | AMF | UE assigned slice |
| > S-NSSAI | | Slice (up to 8 per UE at any given instance) |
| > Timestamp | | A time stamp when slice was assigned |
| > Data Volume | SMF/ UPF | Amount of data volume exchanged at the slice |
| > Transactions count | SMF, AMF | Amount of transactions exchanged at the slice. |
| > Failed transaction count | SMF, AMF | Amount of failed transactions at the slice |
| > Voice call duration | AF | Voice talk time at the slice |
| > Dropped sessions | SMF | Amount of dropped (e.g. timed out) sessions at the slice |

Data collection may be provided on samples (e.g. fixed/camper UEs, spatial subsets of UEs or UE group, temporal subsets of UE location information). For signalling load reduction, collection may focus on top heavy users or fixed and campers. This is achieved by setting the Analytic Filter to "top-heavy users" and "fixed-campers" respectively.

Output Analytics

The NWDAF supporting dispersion analytics is able to provide UE dispersion analytics to consumer NFs or AFs. The dispersion analytics and prediction can be for data, transactions, failed transactions, sessions drop and voice calls.

Data Dispersion Analysis

The data dispersion analytics results provided by the NWDAF could be UE dispersion statistics as defined in Table C and or UE dispersion predictions as defined in Table D:

TABLE C

Data dispersion statistics bound by location

| Information | Description |
|---|---|
| UE group ID or UE ID | Identifies a UE or a group of UEs, e.g. internal group ID defined in TS 23.501 clause 5.9.7, SUPI. |
| Time slot entry (1..max) | List of time slots during the Analytics target period |
| > Time slot start | Time slot start within the Analytics target period |
| > Duration | Duration of the time slot |
| > UE location (1..max) | Observed location statistics |
| >> UE location | TA or cells where the UE dispersed its data |
| >> Application ID (1..max) | To identify the application for the UE |
| >>> Data dispersed | Data volume dispersed at this location and application, if application ID is provided. |
| >> Data classification | Data mobility classification for this location: fixed, camper, traveller |
| >> Data ranking | Percentile ranking of data usage at this location (i.e. % data dispersed at this location) |
| >> Ratio | Percentage of UEs in the group (in case of UE group) |

TABLE D

Data dispersion prediction bound by location

| Information | Description |
|---|---|
| UE group ID or UE ID | Identifies a UE or a group of UEs, e.g. internal group ID defined in TS 23.501 clause 5.9.7, SUPI. |
| Time slot entry (1..max) | List of time slots during the Analytics target period |
| > Time slot start | Time slot start within the Analytics target period |
| > Duration | Duration of the time slot |
| > UE location (1..max) | Predicted location during the analytics target period |
| >> UE location | TA or cells where the UE is predicted to disperse its data |
| >> Application ID (1..max) | To identify the application for the UE |
| >>> Data dispersion | Data volume dispersion prediction at this location and application if application ID is provided. |
| >> Confidence | Confidence of this prediction (i.e. data to be dispersed at this location) |
| >> Data classification | Data mobility classification for this location: fixed, camper, traveller |
| >> Confidence | Confidence of this prediction (i.e. mobility classification at this location) |
| >> Data ranking | Percentile ranking of data usage at this location (i.e. % data dispersed at this location) |
| >> Confidence | Confidence of this prediction (i.e. percentile ranking at this location) |
| >> Ratio | Percentage of UEs in the group (in case of UE group) |

The data dispersion analytics results provided by the NWDAF could be for a UE or group of UEs dispersion statistics at a given slice as defined in Table CC and dispersion predictions as defined in Table DD:

TABLE CC

Data dispersion statistics bound by slice

| Information | Description |
|---|---|
| UE group ID or UE ID | Identifies a UE or a group of UEs, e.g. internal group ID defined in TS 23.501 clause 5.9.7, SUPI. |
| Time slot entry (1..max) | List of time slots during the Analytics target period |
| > Time slot start | Time slot start within the Analytics target period |
| > Duration | Duration of the time slot |
| > Slice (1..max) | Observed slice statistics |
| >> S-NSSAI | Slice where the UE or group of UEs dispersed data |
| >> Application ID (1..max) | To identify the application for the UE at the slice |
| >>> Data dispersed | Data volume dispersed at this slice and application, if application ID is provided. |
| >> Data classification | Data mobility classification for slice: fixed, camper, traveller |
| >> Data ranking | Percentile ranking of data usage at this slice (i.e. % data dispersed at this slice) |
| >> Ratio | Percentage of UEs in the group (in case of UE group) |

TABLE DD

Data dispersion prediction bound by slice

| Information | Description |
|---|---|
| UE group ID or UE ID | Identifies a UE or a group of UEs, e.g. internal group ID defined in TS 23.501 clause 5.9.7, SUPI. |
| Time slot entry (1..max) | List of time slots during the Analytics target period |
| > Time slot start | Time slot start within the Analytics target period |
| > Duration | Duration of the time slot |
| > Slice (1..max) | Predicted slice during the Analytics target period |
| >> S-NSSAI | Slice where the UE is predicted to disperse its data |
| >> Application ID (1..max) | To identify the application for the UE at the slice |
| >>> Data dispersion | Data volume dispersion prediction at this slice and application if application ID is provided. |
| >> Confidence | Confidence of this prediction (i.e. data to be dispersed at this slice) |
| >> Data classification | Data mobility classification for this slice: fixed, camper, traveller |
| >> Confidence | Confidence of this prediction (i.e. mobility classification at this slice) |
| >> Data ranking | Percentile ranking of data usage at this slice (i.e. % data dispersed at this slice) |
| >> Confidence | Confidence of this prediction (i.e. percentile ranking at this slice) |
| >> Ratio | Percentage of UEs in the group (in case of UE group) |

The Application ID in the Data Dispersion Analytics is optional. When the Application ID is missing, the Data Dispersion Analytics is applied across all the applications in an AOI or a slice.

Transactions Dispersion Analysis

The transaction (MM and MS messages) dispersion analytics results provided by the NWDAF could be UE dispersion statistics as defined in Table E or UE dispersion predications as defined in Table F:

TABLE E

Transaction dispersion statistics bound by location

| Information | Description |
|---|---|
| UE group ID or UE ID | Identifies a UE or a group of UEs, e.g. internal group ID defined in TS 23.501 clause 5.9.7, SUPI. |
| Time slot entry (1..max) | List of time slots during the Analytics target period |
| > Time slot start | Time slot start within the Analytics target period |
| > Duration | Duration of the time slot |
| > UE location (1..max) | Observed location statistics |
| >> UE location | TA or cells where the UE dispersed its transactions |
| >> Transaction dispersed | Transactions volume dispersed at this location |
| >> Transaction classification | Transactions mobility classification for this location: fixed, camper, traveller |
| >> Transaction ranking | Percentile ranking of transactions volume at this location (i.e. % transaction dispersed at this location) |
| >> Ratio | Percentage of UEs in the group (in case of UE group) |

TABLE F

Transaction dispersion prediction bound by location

| Information | Description |
|---|---|
| UE group ID or UE ID | Identifies a UE or a group of UEs, e.g. internal group ID defined in TS 23.501 clause 5.9.7, SUPI. |
| Time slot entry (1..max) | List of predicted time slots |
| > Time slot start | Time slot start within the Analytics target period |
| > Duration | Duration of the time slot |
| > UE location (1..max) | Predicted location during the analytic target period |
| >> UE location | TA or cells where the UE is predicted to disperse its transactions |
| >> Transaction dispersion | Transaction volume predicted to be dispersed at this location |
| >> Confidence | Confidence of this prediction (i.e. data to be dispersed at this location) |
| >> Transaction classification | Transaction mobility classification for this location: fixed, camper, traveller |
| >> Confidence | Confidence of this prediction (i.e. mobility classification at this location) |
| >> Transaction ranking | Percentile ranking of transactions at this location (i.e. % transaction dispersed at this location) |
| >> Confidence | Confidence of this prediction (i.e. percentile ranking at this location) |
| >> Ratio | Percentage of UEs in the group (in case of UE group) |

The transaction dispersion analytics results provided by the NWDAF could be UE or group of UEs dispersion statistics at a given slice as defined in Table G and dispersion predictions as defined in Table H:

TABLE G

Transaction dispersion statistics bound by slice

| Information | Description |
|---|---|
| UE group ID or UE ID | Identifies a UE or a group of UEs, e.g. internal group ID defined in TS 23.501 clause 5.9.7, SUPI. |

TABLE G-continued

Transaction dispersion statistics bound by slice

| Information | Description |
|---|---|
| Time slot entry (1..max) | List of time slots during the Analytics target period |
| > Time slot start | Time slot start within the Analytics target period |
| > Duration | Duration of the time slot |
| > Slice (1..max) | Observed slice statistics |
| >> S-NSSAI | Slice where the UE or group of UEs dispersed its transactions |
| >> Transaction dispersed | Transactions volume dispersed at this location |
| >> Transaction classification | Transaction mobility classification for slice: fixed, camper, traveller |
| >> Transaction ranking | Percentile ranking of transactions at this slice (i.e. % transaction dispersed at this slice) |
| >> Ratio | Percentage of UEs in the group (in case of UE group) |

TABLE H

Transaction dispersion prediction bound by slice

| Information | Description |
|---|---|
| UE group ID or UE ID | Identifies a UE or a group of UEs, e.g. internal group ID defined in TS 23.501 clause 5.9.7, SUPI. |
| Time slot entry (1..max) | List of predicted time slots |
| > Time slot start | Time slot start within the Analytics target period |
| > Duration | Duration of the time slot |
| > Slice (1..max) | Predicted slice during the Analytics target period |
| >> S-NSSAI | Slice where the UE is predicted to disperse its transactions |
| >> Transaction dispersion | Transaction volume to be dispersed at this slice |
| >> Confidence | Confidence of this prediction (i.e. transactions to be dispersed at this slice) |
| >> Transaction classification | Transaction mobility classification for this slice: fixed, camper, traveller |
| >> Confidence | Confidence of this prediction (i.e. mobility classification at this slice) |
| >> Transaction ranking | Percentile ranking of transactions at this slice (i.e. % transaction dispersed at this slice) |
| >> Confidence | Confidence of this prediction (i.e. percentile ranking at this slice) |
| >> Ratio | Percentage of UEs in the group (in case of UE group) |

Transactions Failure Dispersion Analysis

Transaction failures dispersion analytics is a metric geared to identify fragile points of contact in the network that are impacting UEs. These could be areas of poor coverage. The transactions failures (MM and MS failed procedures) dispersion analytics results provided by the NWDAF could be UE dispersion statistics as defined in Table I or UE dispersion predication as defined in Table J:

TABLE I

Transaction failure dispersion statistics bound by location

| Information | Description |
|---|---|
| UE group ID or UE ID | Identifies a UE or a group of UEs, e.g. internal group ID defined in TS 23.501 clause 5.9.7, SUPI. |
| Time slot entry (1..max) | List of time slots during the Analytics target period |
| > Time slot start | Time slot start within the Analytics target period |
| > Duration | Duration of the time slot |
| > UE location (1..max) | Observed location statistics |
| >> UE location | TA or cells where the UE dispersed its transactions failures |
| >> Transaction failure dispersed | Transactions failures dispersed at this location |
| >> Transaction failure classification | Transactions failures mobility classification for this location: fixed, camper, traveller |
| >> Transaction failure ranking | Percentile ranking of transaction failures at this location (i.e. % transaction failure dispersed at this location) |
| >> Ratio | Percentage of UEs in the group (in case of UE group) |

TABLE J

Transaction failure dispersion prediction bound by location

| Information | Description |
|---|---|
| UE group ID or UE ID | Identifies a UE or a group of UEs, e.g. internal group ID defined in TS 23.501 clause 5.9.7, SUPI. |
| Time slot entry (1 . . . max) | List of predicted time slots |
| > Time slot start | Time slot start within the Analytics target period |
| > Duration | Duration of the time slot |
| > UE location (1 . . . max) | Predicted location during the analytic target period |
| >> UE location | TA or cells where the UE is predicted to disperse its transaction failures |
| >> Transaction failure | Transaction failure predicted to be dispersed at this location dispersion |
| >> Confidence | Confidence of this prediction (i.e. data to be dispersed at this location) |
| >> Transaction failure classification | Transaction failure mobility classification for this location: fixed, camper, traveller |
| >> Confidence | Confidence of this prediction (i.e. mobility classification at this location) |
| >> Transaction failure ranking | Percentile ranking of transaction failures at this location (i.e. % transaction failures dispersed at this location) |
| >> Confidence | Confidence of this prediction (i.e. percentile ranking at this location) |
| >> Ratio | Percentage of UEs in the group (in case of UE group) |

The transaction dispersion analytics results provided by the NWDAF could be for a UE or group of UEs dispersion statistics at a given slice as defined in Table K and dispersion predictions as defined in Table L:

TABLE K

Transaction failure dispersion statistics bound by slice

| Information | Description |
|---|---|
| UE group ID or UE ID | Identifies a UE or a group of UEs, e.g. internal group ID defined in TS 23.501 clause 5.9.7, SUPI. |
| Time slot entry (1 . . . max) | List of time slots during the Analytics target period |

TABLE K-continued

Transaction failure dispersion statistics bound by slice

| Information | Description |
|---|---|
| > Time slot start | Time slot start within the Analytics target period |
| > Duration | Duration of the time slot |
| > Slice (1 . . . max) | Observed slice statistics |
| >> S-NSSAI | Slice where the UE or group of UEs dispersed transaction failures |
| >> Transaction failure dispersed | Volume of transaction failures dispersed at this location |
| >> Transaction failure classification | Transaction failures mobility classification for slice: fixed, camper, traveller |
| >> Transaction failure ranking | Percentile ranking of transaction failures volume at this slice (i.e. % transaction failures dispersed at this slice) |
| >> Ratio | Percentage of UEs in the group (in case of UE group) |

TABLE L

Transaction failure dispersion prediction bound by slice

| Information | Description |
|---|---|
| UE group ID or UE ID | Identifies a UE or a group of UEs, e.g. internal group ID defined in TS 23.501 clause 5.9.7, SUPI. |
| Time slot entry (1 . . . max) | List of time slots during the Analytics target period |
| > Time slot start | Time slot start within the Analytics target period |
| > Duration | Duration of the time slot |
| > Slice (1 . . . max) | Predicted slice during the Analytics target period |
| >> S-NSSAI | Slice where the UE is predicted to disperse its transaction failures |
| >> Transaction failure dispersion | Prediction of transaction failures dispersion at this slice |
| >> Confidence | Confidence of this prediction (i.e. transactions to be dispersed at this slice) |
| >> Transaction failure classification | Transaction failure mobility classification for this slice: fixed, camper, traveller |
| >> Confidence | Confidence of this prediction (i.e. mobility classification at this slice) |
| >> Transaction failure ranking | Percentile ranking of transaction failures at this slice (i.e. % transaction failure dispersed at this slice) |
| >> Confidence | Confidence of this prediction (i.e. percentile ranking at this slice) |
| >> Ratio | Percentage of UEs in the group (in case of UE group) |

Dropped Sessions Dispersion Analysis

Dropped sessions, or sessions time outs, are non-graceful PDU sessions termination.

Dropped sessions dispersion analytics is a metric geared to identify fragile points of contact in the network that are impacting UEs. These could be areas of poor coverage. The dropped sessions dispersion analytics results provided by the NWDAF could be UE dispersion statistics as defined in Table M or UE dispersion predictions as defined in Table N:

TABLE M

Dropped sessions dispersion statistics bound by location

| Information | Description |
|---|---|
| UE group ID or UE ID | Identifies a UE or a group of UEs, e.g. internal group ID defined in TS 23.501 clause 5.9.7, SUPI. |

TABLE M-continued

Dropped sessions dispersion statistics bound by location

| Information | Description |
|---|---|
| Time slot entry (1 . . . max) | List of time slots during the Analytics target period |
| > Time slot start | Time slot start within the Analytics target period |
| > Duration | Duration of the time slot |
| > UE location (1 . . . max) | Observed location statistics |
| >> UE location | TA or cells where the UE dispersed its dropped sessions |
| >> Dropped Sessions dispersed | Dropped sessions dispersed at this location |
| >> Dropped sessions classification | Dropped sessions mobility classification for this location: fixed, camper, traveller |
| >> Dropped sessions ranking | Percentile ranking of dropped sessions at this location (i.e. % dropped sessions dispersed at this location) |
| >> Ratio | Percentage of UEs in the group (in case of UE group) |

TABLE N

Dropped sessions dispersion prediction bound by location

| Information | Description |
|---|---|
| UE group ID or UE ID | Identifies a UE or a group of UEs, e.g. internal group ID defined in TS 23.501 clause 5.9.7, SUPI. |
| Time slot entry (1 . . . max) | List of predicted time slots |
| > Time slot start | Time slot start within the Analytics target period |
| > Duration | Duration of the time slot |
| > UE location (1 . . . max) | Predicted location during the analytics target period |
| >> UE location | TA or cells where the UE is expected to disperse its dropped sessions |
| >> Dropped Session dispersion | Predicted dropped sessions dispersion at this location |
| >> Confidence | Confidence of dropped sessions prediction at this location |
| >> Dropped Sessions classification | Dropped sessions mobility classification for this location: fixed, camper, traveller |
| >> Confidence | Confidence of this prediction (i.e. mobility classification at this location) |
| >> Dropped Sessions ranking | Percentile ranking of dropped sessions at this location (i.e. % dropped sessions dispersed at this location) |
| >> Confidence | Confidence of this prediction (i.e. percentile ranking at this location) |
| >> Ratio | Percentage of UEs in the group (in case of UE group) |

The dropped sessions dispersion analytics results provided by the NWDAF could be for a UE or group of UEs dispersion statistics at a given slice as defined in Table O and dispersion predictions as defined in Table P:

TABLE O

Dropped sessions dispersion statistics bound by slice

| Information | Description |
|---|---|
| UE group ID or UE ID | Identifies a UE or a group of UEs, e.g. internal group ID defined in TS 23.501 clause 5.9.7, SUPI. |
| Time slot entry (1 . . . max) | List of time slots during the Analytics target period |
| > Time slot start | Time slot start within the Analytics target period |
| > Duration | Duration of the time slot |
| > Slice (1 . . . max) | Observed slice statistics |

TABLE O-continued

Dropped sessions dispersion statistics bound by slice

| Information | Description |
|---|---|
| >> S-NSSAI | Slice where the UE or group of UEs dispersed data |
| >> Dropped sessions | Dropped sessions dispersed at this slice |
| >> Dropped session classification | Dropped session mobility classification for slice: fixed, camper, traveller |
| >> Dropped sessions ranking | Percentile ranking of dropped sessions at this slice (i.e. % dropped sessions at this slice) |
| >> Ratio | Percentage of UEs in the group (in case of UE group) |

TABLE P

Dropped sessions dispersion prediction bound by slice

| Information | Description |
|---|---|
| UE group ID or UE ID | Identifies a UE or a group of UEs, e.g. internal group ID defined in TS 23.501 clause 5.9.7, SUPI. |
| Time slot entry (1 . . . max) | List of predicted time slots |
| > Time slot start | Time slot start within the Analytics target period |
| > Duration | Duration of the time slot |
| > Slice (1 . . . max) | Predicted slice for dropped sessions during the analytics target period |
| >> S-NSSAI | Slice where the UE is predicted to disperse its dropped sessions |
| >> Dropped sessions dispersion | Predicted dropped sessions to be dispersed at this slice |
| >> Confidence | Confidence of this prediction (i.e. transactions to be dispersed at this slice) |
| >> Dropped sessions classification | Dropped sessions mobility classification for this slice: fixed, camper, traveller |
| >> Confidence | Confidence of this prediction (i.e. mobility classification at this slice) |
| >> Dropped session ranking | Percentile ranking of predicted dropped sessions at this slice (i.e. % dropped sessions dispersed at this slice) |
| >> Confidence | Confidence of this prediction (i.e. percentile ranking at this slice) |
| >> Ratio | Percentage of UEs in the group (in case of UE group) |

Voice Calls Dispersion Analysis

The voice call dispersion analytics results provided by the NWDAF could be UE voice calls minutes dispersion statistics as defined in Table R or UE voice calls minutes dispersion predictions as defined in Table S:

TABLE R

Voice calls dispersion statistics bound by location

| Information | Description |
|---|---|
| UE group ID or UE ID | Identifies a UE or a group of UEs, e.g. internal group ID defined in TS 23.501 clause 5.9.7, SUPI. |
| Time slot entry (1 . . . max) | List of time slots during the Analytics target period |
| > Time slot start | Time slot start within the Analytics target period |
| > Duration | Duration of the time slot |
| > UE location (1 . . . max) | Observed location statistics |
| >> UE location | TA or cells where the UE dispersed its voice calls |

TABLE R-continued

Voice calls dispersion statistics bound by location

| Information | Description |
|---|---|
| >> Voice calls minutes dispersed | Voice calls minutes dispersed at this location |
| >> Voice calls classification | Voice calls mobility classification for this location: fixed, camper, traveller |
| >> Voice calls ranking | Percentile ranking of voice calls minutes at this location (i.e. % voice calls minutes dispersed at this location) |
| >> Ratio | Percentage of UEs in the group (in case of UE group) |

TABLE S

Voice calls dispersion prediction bound by location

| Information | Description |
|---|---|
| UE group ID or UE ID | Identifies a UE or a group of UEs, e.g. internal group ID defined in TS 23.501 clause 5.9.7, SUPI. |
| Time slot entry (1 . . . max) | List of predicted time slots |
| > Time slot start | Time slot start within the Analytics target period |
| > Duration | Duration of the time slot |
| > UE location (1 . . . max) | Predicted location for dispersed voice call |
| >> UE location | TA or cells where the UE predicted to disperse its voice calls |
| >> Voice calls dispersion | Voice calls minutes predicted to be dispersed at this location |
| >> Confidence | Confidence of this prediction (i.e. data to be dispersed at this location) |
| >> Voice calls classification | Voice call mobility classification for this location: fixed, camper, traveller |
| >> Confidence | Confidence of this prediction (i.e. mobility classification at this location) |
| >> Voice calls ranking | Percentile ranking of voice calls minutes to be dispersed at this location (i.e. % voice calls minutes dispersed at this location) |
| >> Confidence | Confidence of this prediction (i.e. percentile ranking at this location) |
| >> Ratio | Percentage of UEs in the group (in case of UE group) |

The voice calls dispersion analytics results provided by the NWDAF could be for a UE or group of UEs dispersion statistics at a given slice as defined in Table T and dispersion predictions as defined in Table U:

TABLE T

Voice calls dispersion statistics bound by slice

| Information | Description |
|---|---|
| UE group ID or UE ID | Identifies a UE or a group of UEs, e.g. internal group ID defined in TS 23.501 clause 5.9.7, SUPI. |
| Time slot entry (1 . . . max) | List of time slots during the Analytics target period |
| > Time slot start | Time slot start within the Analytics target period |
| > Duration | Duration of the time slot |
| > Slice (1 . . . max) | Observed slice statistics |
| >> S-NSSAI | Slice where the UE or group of UEs dispersed voice call minutes |
| >> Voice calls dispersion | Voice calls minutes dispersed at this slice |
| >> Voice calls classification | Voice calls Mobility classification at this slice: fixed, camper, traveller |

TABLE T-continued

Voice calls dispersion statistics bound by slice

| Information | Description |
|---|---|
| >> Voice calls ranking | Percentile ranking of voice calls minutes at this slice (i.e. % voice calls minutes dispersed at this slice) |
| >> Ratio | Percentage of UEs in the group (in case of UE group) |

TABLE U

Voice calls dispersion prediction bound by slice

| Information | Description |
|---|---|
| UE group ID or UE ID | Identifies a UE or a group of UEs, e.g. internal group ID defined in TS 23.501 clause 5.9.7, SUPI. |
| Time slot entry (1 . . . max) | List of predicted time slots |
| > Time slot start | Time slot start within the Analytics target period |
| > Duration | Duration of the time slot |
| > Slice (1 . . . max) | Predicted slice during the Analytics target period |
| >> S-NSSAI | Slice where the UE or group of UEs are predicted to disperse voice call minutes |
| >> Voice calls dispersion | Voice calls minutes predicted to be dispersed at this slice |
| >> Confidence | Confidence of this prediction (i.e. voice calls minutes at this slice) |
| >> Voice calls classification | Voice calls mobility classification for this slice: fixed, camper, traveller |
| >> Confidence | Confidence of this prediction (i.e. mobility classification at this slice) |
| >> Voice calls ranking | Percentile ranking of voice calls dispersion at this slice (i.e. % voice calls minutes dispersed at this slice) |
| >> Confidence | Confidence of this prediction (i.e. percentile ranking at this slice) |
| >> Ratio | Percentage of UEs in the group (in case of UE group) |

Monitored Transactions

The following are examples of the session and mobility procedures and/or messages monitored by transaction dispersion analytics where the sum of procedures or messages is reported by the AMF and SMF. These examples include the following messages listed in Table V and W.

TABLE V

SM procedure/messages

| 5GS Session Management Message | Reference TS 23.502 | Reference (TS 24.501) |
|---|---|---|
| Session est, procedure: PDU session establishment accept | 4.3.2.2 | 8.3.2 |
| Session est. procedure: PDU session establishment reject | 4.3.2.2 | 8.3.3 |
| Auth procedure: PDU session authentication complete | 4.3.2.3 | 8.3.5 |
| Auth procedure: PDU session authentication result | 4.3.2.3 | 8.3.6 |
| Session mod. procedure: PDU session modification reject | 4.3.3 | 8.3.8 |
| Session mod procedure: PDU session modification command | 4.3.3 | 8.3.9 |
| Session Rel procedure: PDU session release reject | 4.3.4 | 8.3.13 |
| Session Rel procedure: PDU session release command | 4.3.4 | 8.3.14 |

TABLE W

MM procedure/messages

| 5GS Mobility Management Messages | Reference TS 23.502 | Reference (TS 24.501) |
|---|---|---|
| Authentication procedure: Authentication request | | 8.2.1 |
| Authentication procedure: Authentication results | | 8.2.3 |
| Authentication procedure: Authentication Reject | | 8.2.5 |
| Registration procedure: Registration accept | 4.2.2.2 | 8.2.7 |
| Registration procedure: Registration Reject | 4.2.2.2 | 8.2.9 |
| De-reg procedure: De-registration accept (UE originated) | 4.2.2.3 | 8.2.13 |
| De-Reg procedure: De-registration request (UE terminated) | 4.2.2.3 | 8.3.14 |
| Service Req procedure: Service accept | 4.2.3 | 8.2.17 |
| Service Req procedure: Service reject | 4.2.3 | 8.2.18 |
| UE Config procedure: Configuration update command | 4.2.4 | 8.2.19 |
| Reg management procedure: Identity request | 4.2.2 | 8.2.21 |
| Reg management procedure: Security mode command | 4.2.2 | 8.2.25 |
| Network slice-specific authentication command | 4.2.9 | 8.2.31 |
| Network slice-specific authentication result | 4.2.9 | 8.2.33 |

Monitored Transaction Failures

The following are examples of the session and mobility procedures and/or messages monitored by transaction failure dispersion analytics where the sum of the procedure or messages is reported by the AMF and SMF. These examples include but are not limited to the following messages listed in Table X and Y.

TABLE X

SM procedure/messages

5GS Session Management Message
Session est. procedure: PDU session establishment reject
Session est. procedure: PDU session modification reject
Session mod procedure: PDU session modification command reject
Session Release procedure: PDU session release reject

TABLE Y

MM procedure/messages

5GS Mobility Management Messages
Authentication procedure: Authentication Failure
Registration procedure: Registration Reject
Service Req procedure: Service reject
Authentication procedure: Security mode reject
Network slice-specific authentication result (failure)

Example of Procedures Using Dispersion Analytics

The NWDAF can provide UE dispersion analytics, in the form of statistics or predictions or both, to another NF. If the NF is an AF, and when the AF is untrusted, the AF will request analytics via the NEF, and the NEF will then convey the request to the NWDAF.

FIG. 4C illustrates call flow for an enabling network automation (eNA) framework, mirroring UE Dispersion Analytics provided to an NF. In step one, the consumer's request for analytics 402 is delivered to NWDAF 445. In step two, NWDAF 445 collects the input data from AMF, SMF and AF 458 and delivers the analytics output in steps four 462 and again in step seven 482.

The registration procedure into the network can be seen in TS 23 502 "FIG. 4.2.2.2.2-1: Registration procedure". The disclosed technology adds the ability of the AMF to also collect UE profile information from the NWDAF 445 about the UE (user) 419 attempting to register to the network. If the UE is a heavy user, the AMF 413 can make a decision to reject the user instead of accepting as shown in step 21 of FIG. 4.2.2.2.2-1. A rejection may imply sending the UE to another network or another slice. This is a closed loop decision/operation. Details for the steps are described next.

The NF sends a request to the NWDAF for dispersion analytics on a specific UE, any UE, or a group of UEs, using either the Nnwdaf_AnalyticsInfo or Nnwdaf_AnalyticsSubscription service 402. The NF can request statistics or predictions or both. The type of analytics is set to UE Dispersion Analytics, the dispersion analytic (DA) type combination (i.e. data volume, transactions, transactions failure, dropped calls, voice minutes) and analytic filter information=(Area of Interest, slice, target period). The NF provides the UE id or Internal Group ID in the Target of Analytics Reporting.

If the request is authorized, and in order to provide the requested analytics, the NWDAF may subscribe to events with all the serving AMFs, SMFs of the requested UE(s) for notification of location changes or a slice change (a slice change can be an additional slice or a deletion) 458. This step may be skipped when e.g. the NWDAF already has the requested analytics available.

The NWDAF subscribes to voice service data from AF(s) by invoking Naf_EventExposure_Subscribe service or Nnef_EventExposure_Subscribe (if via NEF).

Step 3. The NWDAF derives requested analytics.

The NWDAF provides requested UE dispersion analytics to the NF, using either the Nnwdaf_AnalyticsInfo_Request Response or Nnwdaf_AnalyticsSubscription_Notify 462, depending on the service used in step 1 402. The details for UE dispersion analytics provided by NWDAF are described in clause 6.30.1.4. The provided analytics enables the consumer to predict changing network conditions such as data volume change at a location or a slice, signalling storm conditions at a location or a slice, etc.

Steps 5-6. If at step 1, the NF has subscribed to receive notifications for UE dispersion analytics, after receiving event notification from the AMFs (e.g. location change) or SMFs (e.g. slice change add/delete) subscribed by NWDAF in step 2, the NWDAF may generate new dispersion analytics The NWDAF provides the newly generated dispersion analytics to the NF 482. The details for UE dispersion analytics provided by NWDAF are described earlier.

Assistance to Slice Load Distribution Procedure

In this procedure the NSSF, or AMF when NSSF is not deployed, subscribes to receive slice load analytics and attempts to avoid further overloading the slice with new UE registration or redirect heavy users to another slice or slice instance. When a slice or slice instance is not receiving acceptable service experience and is heavily loaded the NSSF or AMF requests the NWDAF to report the data dispersion analytics of registered UE on the slice and also report the predicted dispersion of a UE attempting to register at the slice. With a data volume loading information, the NSSF can decide when to stop admitting heavy users into a particular slice. The NSSF may decide to allow just travelers' additions to a loaded slice and redirect fixed and camper data users to a different slice.

Restriction of UE Registration

A UE wants to register to the network but before admitting the UE to the network, the NSSF or AMF obtains the loading analytics of the area of interest (e.g. cell-sector) or the slice or both from the NWDAF. The registration procedure into the network can be seen in TS 23.502 FIG. 4.2.2.2.2.-1. The disclosed technology adds the ability of the AMF to also collect UE profile information from the NWDAF about the UE (i.e. user) attempting to register to the network. If the UE is a heavy user, the AMF can make a decision to reject the user instead of accepting as shown in step 21 of FIG. 4.2.2.2.2-1. A rejection may mean sending the UE to another network, another RAT, another operating frequency or another slice. This is a closed loop decision/operation.

FIG. 4D shows the procedure for slice load distribution, for accepting registration of new UE additions. NSSF 401 (or AMF 413 when NSSF 401 is not deployed) requests to obtain the load analytics 404 of a slice and receives the information from the NWDAF through Nnwdaf_AnalyticsSubscription_Notify or Nnwdaf_AnalyticsInfo_Request response.

Due to loading conditions of the slice, NSSF 401 (or AMF 413) determines that restrictions should be applied when new UEs 419 attempt to enter the loaded slice. Based on received analytics, NSSF 401 decides that restriction to the network slice is required 414. A slice restriction message 424 is sent from the NSSF 401 to the AMF in the form of notification service indication that the detected S-NSSAI should not be used for new UE registration. The notification contains the restricted S-NSSAI.

New UE 419 is attempting to register on a loaded slice 434. The NSSF 401 (or AMF 413) is requesting data volume slice dispersion analytics prediction for the attempting UE 454. Per UE statistical information, the NWDAF 445 derives prediction for the data consumption of the user on the slice, the ranking and the classification (heavy-user, camper, traveller) of the user 464. The prediction for the expected data consumption of the user on the slice, the volume ranking on the slice and user classification (heavy-user, camper, traveller) is delivered to the NSSF 401 (or AMF 413) 474.

Based on the NWDAF provided data, the NSSF 401 (or AMF 413) uses the data volume dispersion, ranking and classification information and possibly other pertinent information per local policies, to decide whether to accept the UE or reject the registration attempt 484. For example, the slice admission policy for loaded slice may allow just UEs classified as travellers to be accepted into a loaded slice. The AMF then rejects the Registration Request indicating the rejected S-NSSAI with an appropriate rejection cause value.

Restriction of PDU Session Establishment in a Slice

A user already registered to the network, may want to establish a new or additional session (protocol data unit (PDU) session). PDU session establishment is captured in TS 23.502 FIG. 4.3.2.2.1-1, and using the same logic explained earlier, the AMF may not establish a session for a heavy user and the session request will be rejected instead of accepted as shown in step 13 of 4.3.2.2.1-1.

FIG. 4E shows the disclosed procedure for slice load distribution for accepting PDU session establishment of registered UE, showing additions required to introduce dispersion analytics.

NSSF 401 (or AMF 413 when NSSF is not deployed) requests to obtain the load analysis of a slice and receives the information from the NWDAF 445 through Nnwdaf_AnalyticsSubscription_Notify or Nnwdaf_AnalyticsInfo_Request response 406.

Due to loading conditions of the slice, NSSF 401 (or AMF 413) determines that restrictions should be applied when new PDU sessions are established on the loaded slice 416.

A message is sent from the NSSF 401 to the AMF 413 in the form of notification service indication that the detected S-NSSAI should not accept new PDU session 426. The notification contains the restricted S-NSSAI.

A registered UE attempts to establish a PDU session 436. The AMF 413 requests data volume slice dispersion analytics prediction 446 for the UE attempting to establish a PDU session.

Per UE statistical information, the NWDAF derives prediction for the data consumption of the user on the slice, the ranking and the classification (heavy-user, camper, traveller) of the user 456. The prediction for the expected data consumption of the user on the slice, the volume ranking on the slice and user classification (heavy-user, camper, traveller) 466 is delivered to the AMF 413. Based on the NWDAF provided data, the AMF 413 uses the data volume dispersion, ranking and classification information and possibly other pertinent information per local policies, to decide whether to establish a PDU session 486 or reject the attempt 476. For example, the PDU establishment policy of a loaded slice may permit only PDU sessions for UEs classified as travellers.

User Data Congestion Mitigation

FIG. 4F illustrates a disclosed procedure for user data congestion mitigation. In this procedure, upon notification of one-time or continuous user plan data congestion in an area of interest, (see TS 23.288 clause 6.8), the PCF 441 requests the NWDAF 445 to report the data dispersion analytics of either any user or just the heavy users located at the congested area of interest. This information is derived from the amount of data volume dispersed at that location by the users either as statistical information and/or predication. With this data volume dispersion analytics, the PCF 441 can decide for example whether to remove PCC Rules for heavy users, that will trigger QoS flow removal by the SMF 453 and whether to not assign PCC Rules to a newly requested heavy user's QoS flow. Such PCF decision may help on leading to a reduction of the heavy user's data consumption and the data volume demand at the location. A policy update to mitigate congestion may involve change to non-GBR QoS flows, modification of the UE-AMBRR which is the aggregated bit rate across all non-GBR QoS flows of the UE, Session-AMBR, which is the aggregated maximum bitrate of non-GB flows of the PDU session, update to RFSP and/or service area restriction.

The steps of the user data congestion mitigation procedure are described next. User data congestion at an area of interest (AOI) is reported to all PCFs 408 per steps 1 through 5 in TS 23.288 procedure 6.8.4. This also maps to internal event notification, steps 1d in TS 23.502 subclause 4.16.5.2.

For a potential policy change decision, the PCFs 441 request data volume dispersion analysis for the UE in the requested AOI from the NWDAF 418. In this use case example, AOI is the reported congested area. If the Analytic Filter is set to "top-heavy users" the request is just for the top-heavy data users, otherwise the request is for data dispersion analytics of all UEs in the AOI. If the NWDAF needs to retrieve the list of UEs in the area of interest, it may subscribe to UE mobility event notifications of AMFs as described in clause 5.3.4.4 of TS 23.501 using event ID "UE moving in or out of Area of Interest" and Event Filters as described in Table 5.2.2.3.1-1 of TS 23.502.

The PCF 441 obtains, from the NWDAF 445, information that the area of interest (ex. cell) is congested 418. Per statistical information and/or prediction, the NWDAF 445 derives and ranks the fixed and camping data volume users at the requested area of interest 428. The NWDAF 445 identifies the users in the requested area of interest and per Analytic Filter settings, returns in the response to the PCF an entry for each user or an entry for each top-heavy user 448. The response includes statistics or prediction of data volume dispersion at the location, the user ranking and classification (fixed, camper, traveler at the location) as defined in Tables C and D.

Based on the NWDAF provided data, the PCFs 441 use the data volume dispersion and ranking information and possibly other pertinent information per the PCF local policies, to decide whether to apply a policy change to certain reported UEs under their control 468. To mitigate congestion, the PCF 441 may reduce the allowed bandwidth of certain users. It can do that in many ways. It can apply AM policy association termination, as captured in TS 23.502 FIG. 4.16.3.2-1. It can apply SM policy association modification as captured in TS23.502 FIGS. 4.16.5.1-1 and 4.16.5.2-1, or SM policy association termination captured in FIG. 4.16.6-1. The AM policy association modification options are listed in step 4 of TS 23.502 FIG. 4.16.2.2-1 and includes the following: the AMF deploys the access and mobility control policy, which includes storing the Service Area Restrictions and Policy Control Request Trigger of AM Policy Association, provisioning the Service Area Restrictions to the UE and provisioning the RFSP index, UE-AMBR and Service Area Restrictions to the NG-RAN as defined in TS 23.501. The RFSP (RAT, Frequency Selection Priority) index is an index to specific Radio Resource Manager (RRM) configuration in the 5G RAN. These are closed loop actions the PCF can apply to mitigate congestion.

The PCFs 441 perform AM or SM policy modification to the UEs under their control as described in TS 23.502 clause 4.16.5.2 steps 4 and 5. A policy modification to mitigate congestion may involve for example change non-GBR QoS flows, modification of UE-AMBR, which is the aggregated bit rate across all non-GBR flows of the PDU session, update to RFSP and/or service area restriction. For example, in order to mitigate the user plane data congestion, the PCF 441 may use the data dispersion for an application to update the policy of the QoS flows for the application (e.g. reduce the GFBR or MFBR).

Signalling Storm Mitigation

When signaling storm is detected, the consumer (PCF 441, SMF 453, UDM 411 or AMF 413) can collect from the NWDAF 445 the signaling dispersion analytics of all UEs located in AOI (e.g. cell) and apply one of the following closed loop actions. If the consumer is a PCF 441, it may perform a SM policy association termination as described in TS 23.502 clause 4.16.6. If the consumer is the UDM 411, it may decide based on the dispersion information and possible other pertinent information per local policies to delete the subscriber's RM context and PDU sessions, the UDM 411 may send a deregistration notification with removal reason set to "subscription withdrawn" to the registered AMF 413 as described in 23.502 clause 4.2.2.3.3. The UDM 411 may also trigger a PCF initiated UE policy termination as described in 23.502 clause 4.16.13.2. If the consumer is an AMF 413, based on the dispersion information and possible other pertinent information per local policies, may initiate AM policy association termination or UE policy association termination as described in 23.502 clause 4.16.3 and 4.16.13 respectively. If the consumer is SMF 453, it may initiate SM policy association termination as described in 23.502 clause 4.16.6.

In a procedure for signaling storm mitigation, a consumer suspects a signalling storm attack. The consumer can be NF (e.g. AMF, SMF, UDM, AF) or the OAM. The procedure for signaling storm mitigation can help the consumer identify the top UEs that are causing excess signalling activity and per operator policy take actions to defend a potential DDoS attack. Likewise, a consumer such as, AMF, NSSF, PCF or OAM may want to detect the top UEs that are causing signalling in an area of interest or a slice.

The consumer requests the NWDAF to report the transaction dispersion analytics of either any user or just the heavy transaction dispersion users located at the suspected area of interest (e.g. cell, TAI). This information is derived from the amount of transactions and/or transaction failures dispersed at that location by the users either as statistical information and/or predication. With this transactions and transaction failure dispersion analytics, the consumer per operator policy can decide to defend the potential signalling/DDoS attack. Consumer such as AMF can force UE policy termination and reject suspected UE registration. The SMF may terminate the subscriber's policy association and reject new PDU sessions requests of suspected UEs, PCF may remove all the PCC rules of transaction-heavy users and he NSSF reject UE registration on a requests slice.

Signalling Storm Mitigation in an Area Of Interest

Signalling storm in an area of interest is suspected by a consumer. To analyze suspected signalling attack, the consumer requests transaction dispersion analysis for the UEs in the requested Area Of Interest from the NWDAF (i.e. in this UC, AOI is the suspected area). If the Analytic Filter is set to "top-heavy users" the request is just for the top-heavy transaction dispersion users, otherwise the request is for data dispersion analytics of all UEs in the AOI. If the NWDAF needs to retrieve the list of UEs in the area of interest, it may subscribe to UE mobility event notifications of AMFs as described in clause 5.3.4.4 of TS 23.501 using event ID "UE moving in or out of Area of Interest" and Event Filters as described in Table 5.2.2.3.1-1 of TS 23.502.

Per statistical information and/or prediction, the NWDAF derives and rank the fixed and camping transaction dispersion users at the requested area of interest. The NWDAF identifies all the users in the requested area of interest and per Analytic Filter settings, returns in the response to the consumer an entry for each user or an entry for each top-heavy user. The response includes statistics or prediction of transaction (or transaction failure) dispersion at the location, the user ranking and classification (fixed, camper, traveller at the location) as defined in Tables E and F.

Based on the NWDAF provided data, the consumer uses the transaction dispersion and ranking information and possibly other pertinent information per the local policies, to decide whether to apply mitigation procedures through a policy change to certain reported UEs under its control. The consumer, based on the dispersion information and possible other pertinent information per local policies, performs mitigation procedure. For example, if the consumer is a PCF, it may perform a SM policy association termination as described in TS 23.502 clause 4.16.6. If the consumer is the UDM, it may decide based on the dispersion information and possible other pertinent information per local policies to delete the subscriber's RM context and PDU sessions, the UDM may send a deregistration notification with removal reason set to "subscription withdrawn" to the registered AMF as described in 23.502 clause 4.2.2.3.3. The UDM may also trigger a PCF initiated UE policy termination as described in 23.502 clause 4.16.13.2. If the consumer is an AMF, based on the dispersion information and possible other pertinent information per local policies, may initiate AM policy association termination or UE policy association termination as described in 23.502 clause 4.16.3 and 4.16.13 respectively. If the consumer is SMF, it may initiate SM policy association termination as described in 23.502 clause 4.16.6.

The consumer may set the DA type to transaction failure when the analysis is focusing on dispersion of failed transactions. For a deeper analysis of transactions handling in the AOI, the consumer may run two procedures, one for transactions dispersion and one for transaction failures dispersion. When AOI is under denial of service attack, the failed transactions will linearly correlate to the transactions.

Signalling Storm Mitigation in a Slice

Signalling storm in a slice is suspected by a consumer.

To analyze suspected signalling attack, the consumer requests transaction dispersion analysis for the UEs at the suspected slice from the NWDAF. If the Analytic Filter is set to "top-heavy users" the request is just for the top-heavy transaction dispersion users, otherwise the request is for data dispersion analytics of all UEs registered with the slice.

Per statistical information and/or prediction, the NWDAF derives and rank the fixed and camping transaction dispersion users at the requested slice. The NWDAF identifies all the users in the requested slice and per Analytic Filter settings, returns in the response to the consumer an entry for each user or an entry for each top-heavy user. The response includes statistics or prediction of transaction (or transaction failure) dispersion at the slice, the user ranking and classification (fixed, camper, traveller at the location) as defined in Tables K and L.

Based on the NWDAF provided data, the consumer uses the transaction dispersion and ranking information and possibly other pertinent information per the local policies, to decide whether to apply mitigation procedures through a policy change to certain UEs under its control. The consumer, based on the dispersion information and possible other pertinent information per local policies, performs mitigation procedure. For example, if the consumer is a PCF, it may perform a SM policy association termination as described in TS 23.502 clause 4.16.6. If the consumer is the UDM, it may decide based on the dispersion information and possible other pertinent information per local policies to delete the subscriber's RM context and PDU sessions, the UDM may send a deregistration notification with removal reason set to "subscription withdrawn" to the registered AMF as described in 23.502 clause 4.2.2.3.3 (step 6). The UDM may also trigger a PCF initiated UE policy termination as described in 23.502 clause 4.16.13.2. If the consumer is an AMF, based on the dispersion information and possible other pertinent information per local policies, may initiate AM policy association termination or UE policy association termination as described in 23.502 clause 4.16.3 and 4.16.13 respectively. If the consumer is SMF, it may initiate SM policy association termination as described in 23.502 clause 4.16.6.

The consumer may set the DA type to transaction failure when the analysis is focusing on dispersion of failed transactions. For a deeper analysis of transactions handling at the slice, the consumer may run two procedures, one for transactions dispersion and one for transaction failures dispersion. When a slice is under denial of service attack, the failed transactions will linearly correlate to the transactions.

Analysis of Suspicious Abnormal UE Behaviour

In this disclosed procedure for analysis of suspicious abnormal UE behaviour, a consumer (AMF, SMF) is notified that UE is misbehaving, receiving from the NWDAF a notification of suspected abnormal behaviour of a UE with an indication of DDoS. Upon such notification, the AMF and SMF can collect present transaction analysis from the NWDAF and then compare the present dispersion analytics to the expected one and if deviation is significant and mitigation is required, the following closed loop tasks can be performed.

The consumer can run the following procedure with the same analytic filter applied to the abnormal behaviour analytics (i.e. AOI, S-NSSAI) to detect the current signalling dispersion activity and compare it to a stored dispersion signalling profile of the UE. The stored location of the dispersion signaling profile can be a data lake or a data base located for example at the UDM. For expedient analysis, the detection of current signalling dispersion may include a short duration in the input parameters.

AMF or SMF (NWDAF consumers) receive information of misused UE as indicated in TS 23.288 step 5, procedure 6.7.5.4-1. To further analyze the suspected UE, the consumer (AMF or SMF) requests a current transaction dispersion analysis for the UEs at the suspected AOI or slice. Depending on the suspected severity, the duration of analyzed period may be short. The NWDAF derives, ranks and characterizes the user at the requested target (AOI or slice) and provides the info to the requesting consumer (AMF, SMF). The consumer retrieves the expected transaction dispersion transaction data and compares it to the information received. Based on the deviation of the current UE dispersion transaction at the slice or AOI from the expected transaction dispersion, the consumer uses the comparison and possibly other pertinent information per the local policies, to decide whether to apply mitigation procedures through a policy change to the suspected UE. The consumer, based on the dispersion information and possible other pertinent information per local policies, performs mitigation procedure. If the consumer is an AMF, it may initiate AM policy association termination or UE policy association termination as described in 23.502 clause 4.16.3 and 4.16.13 respectively. If the consumer is SMF, it may initiate SM policy association termination as described on 23.502 clause 4.16.6.

A UE wants to register to the network but before admitting the UE to the network, the NSSF or AMF obtains the slice loading analytics from the NWDAF. The registration procedure into the network can be seen in TS 23.502 FIG. 4.2.2.2.2.-1.

The disclosed procedure for slice load distribution, for accepting registration of new UE additions, described relative to FIG. 4D, adds the ability of the AMF to also collect UE profile information from the NWDAF about the UE (i.e. user) attempting to register to the network. If the UE is a heavy user, the AMF can make a decision to reject the user instead of accepting as shown in step 21 of FIG. 4.2.2.2.2-1. A rejection may mean sending the UE to another network or another slice or another RAT. This is a closed loop decision/operation.

Mobility Indices and Example Dashboard

The disclosed technology includes allowing NWDAF 445 to provide elaborated output to its potential consumers, as well as utilizing the collected information to calculate the dispersion indices for UE(s) to determine network centric attributes. Dispersion analytics result in new types of outputs and recommendations in addition to mobility and communication analysis. An example analytic dashboard can consume NWDAF output and include a subscriber's profile, mobility and dispersion indices, a mobility dispersion map, a data dispersion map, failure dispersion map, transaction dispersion map and service usage, in one implementation. A dashboard that shows user mobility indices can aid understanding of the user's favorite camping places when using different services and where he experiences failures. The dashboard can also show a user's typical mobility behavior and insights into whether or not there are recent significant changes in such behavior. Further, the dashboard can illustrate dispersion analytics that offer insights into common problems which motivate humans to call for technical assistance to address call originations, call terminations, no internet access and data speed issues. Access to these insights enables pro-active analytics for problem remediation before a human calls for technical assistance, incurring undesirable operational costs to an operator.

One example of dispersion analytic, a majority dispersion index (mdi), reflects the number of top camping locations for a UE. A configurable majority threshold, discussed earlier, can be used for a count of the visited camping cells in a window of time, say a day. If a user is "fixed or pseudo-fixed", where fixed means stationary, the value of mdi is always 1 because by definition, a user is fixed when almost all of his usage is on a single cell. However, not every user with an mdi of 1 is fixed since the criteria for mdi is that a majority of his usage be on the same cell, not essentially all of it. Users that tend to use network services while on the move (e.g., mass transit commuters) may have data mdi values as high as 8 or 10, though some exceptionally mobile users (e.g., uber drivers) can have a larger number. Another example of dispersion analytic, heavy dispersion index (hdi), reflects the network perspective by counting the number of cells on which the user had heavy usage. For example, for computing the data hdi say 100 MB is set as a threshold for heavy usage. Alternatively, heavy usage can be configured for values of 50 MB, 150 MB, 250 MB, 500 or somewhere in a range of 50-500 MB or 50-250 MB or 50-150 MB. The chosen threshold impacts the value of hdi as it defines what is heavy usage by the UE, so it should be chosen after analysis of prevailing data volume on a current network. The value of this threshold is likely to increase over time as networks become faster and as streaming technologies become more dominant. The heavy data dispersion index reflects the number of cells at which the UE used 100 MB of data. The dispersion indices define spans of activity and locality of usage for activity, as shown in the examples.

In some cases, additional types of dispersion analytic outputs and recommendations can be identified and displayed, that utilize a set of inputs that are deemed necessary and the data that would need to be collected by the NWDAF for providing the additional types of dispersion output analytics and recommendations.

User mobility statistics have much unrealized potential. In areas such as self-driving cars, 5G standards have defined requirements for continuous prediction of instantaneous user mobility, such as trajectory projection for customized services. While user mobility analysis for infrastructure development and management presents new requirements and opportunities for 5G technology, user mobility analysis for user care or customer relations management can be applied to 3G and 4G networks as well. Next we describe metrics and a framework for mobility, highlighting its value for various use cases.

User mobility analysis can enhance user care and customer relations management functions. New user care dashboards can provide mobility insights. Currently available information can be enriched with data that reveals the user's favorite camping places and where the user experiences failures. Focus on locations that recently account for a majority of the user's volume can reveal whether or not there have been significant changes in user behavior. Problems that can be tracked by user mobility analysis include favorite locations for call originations, call terminations, lack of Internet access and low data speed. Widgets in a user interface can be flexibly combined into dashboards to provide mobility insights for specific needs of care agents, supporting a focus on exposing performance and location metrics, in one implementation.

Figure 5:
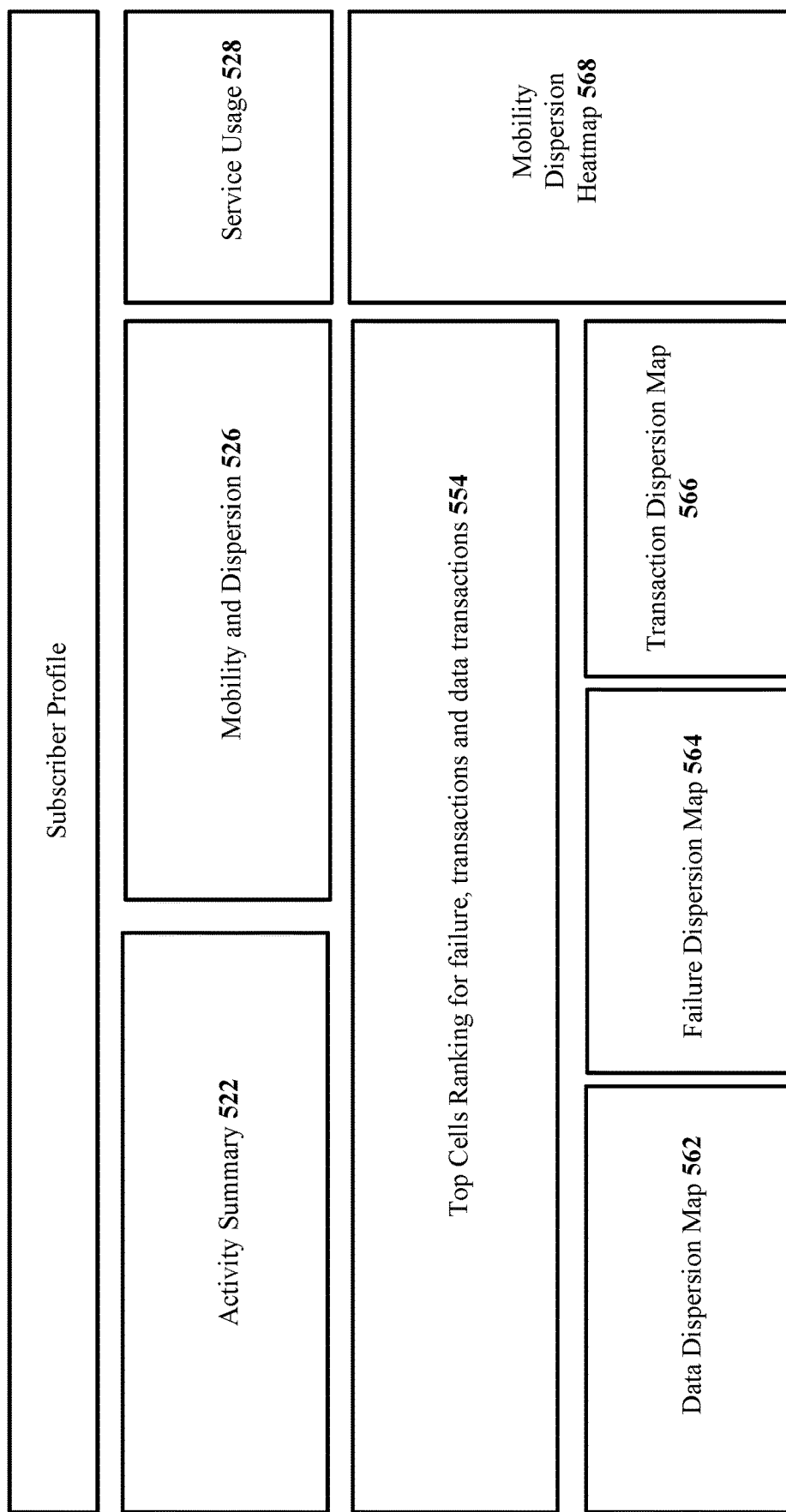
FIG. 5 shows an example dashboard for mobility and dispersion analytics for the disclosed technology.

FIG. 5 shows an example dashboard for mobility and dispersion analytics for the disclosed technology. FIG. 6 through FIG. 13 display example data for widgets of the example dashboard. Many of the dispersion-related panels in this example dashboard are explained in subsequent figures. The subscriber profile and service usage widgets are not particularly related to dispersion and are not shown in additional figures. The widgets from this example dashboard could be hierarchically divided into two or more dashboards, depending on the screen real estate available. Similarly, the arrangement of widgets on the dashboard could be different or could be user customizable.

Figure 6:
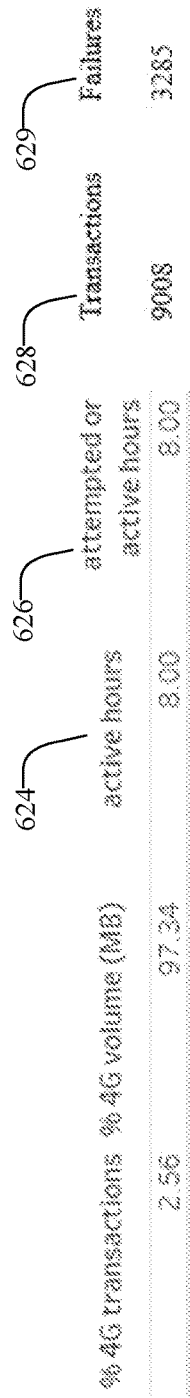
FIG. 6 shows example data displayed by a widget for an activity summary of user statistics.

FIG. 6 shows example data displayed by a widget for activity summary 522, of user statistics provided for a 4G network, because the user's daily interaction with the cellular provider is mostly on the 4G network. In the example dashboard, activity summary 522 illustrates statistics that include the percent of overall transactions (not just data transactions) on the 4G network, the 4G data volume, the number of active hours and attempted active hours, and the numbers of transactions and transaction failures. In this example, nearly all the data volume (97%) is on the 4G network, but the 4G network accounts for less than 3% of user equipment's cellular network transactions. Because the user equipment is not a chatty device where the user is inactive, the active hours 624 matches the attempted hours 626. Surprisingly, the number of failures 629 is a substantial fraction of transactions 628. Some statistics in the activity summary are overall statistics; others could be based on locations in which a majority of user activity takes place.

Figure 7:
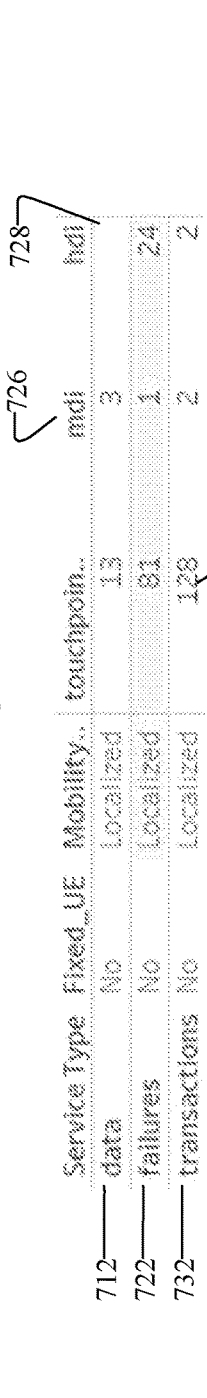
FIG. 7 shows example data displayed by a widget for mobility and dispersion, for quantifying the number of touchpoints a user has with the network regarding different activities such as data, voice origination/termination, failures and transactions.

FIG. 7 shows example data displayed by a widget for mobility and dispersion 526 for quantifying the number of touchpoints a user has with the network regarding different activities such as data, voice origination/termination, failures and transactions. It also captures how the user disperses most of these activities throughout the day, in order to measure their locality. Users are classified as fixed or falling into a limited number of mobility bins as per their dispersion. This example illustrates an actual user's high number of touch points 736 and low number of cells over which a majority of usage is dispersed. This user traversed 128 cells or touch points. A small number of cells, only two of the 128 cells, accounted for a majority of the user's transactions. In the table shown, there are rows for data usage 712, failures 722 and transactions 732. The user is classified as fixed or not with respect to each service type. Within each service type, a non-fixed user can be further classified as belonging to one of several mobility classes, depending on his degree of mobility. Mobility classes can be defined for any network and will generally be a small number of categorical bins. For the widget for mobility and dispersion 526, the user has been assigned to the "localized" mobility class based on his dispersion of usage for data, failures and transactions. In the first row, data volume is dispersed over 13 touch points, of which three account for the majority of volume 726. None of these data touch points experienced a high data volume, as indicated by the null hdi column 728. In the second row, the user experienced failures at 81 of 128 touch points. The majority of these failures were in a single location, leading to a failure mdi of 1. A high number of failures was experienced at 24 of the 81 failure touch points. In this context, the high dispersion index is measured by failure count, rather than data volume. In row three, only two out of 128 touch points accounted for the majority of user transactions. The high dispersion index, based on count of transactions, similarly accounts for high volumes of transactions across just two out of the 128 touch points. This table makes it apparent that the threshold counts for transactions in the hdi column is larger than the threshold for failures.

the percentage of the user's overall activity for the day is displayed for each cell.

Figure 8:
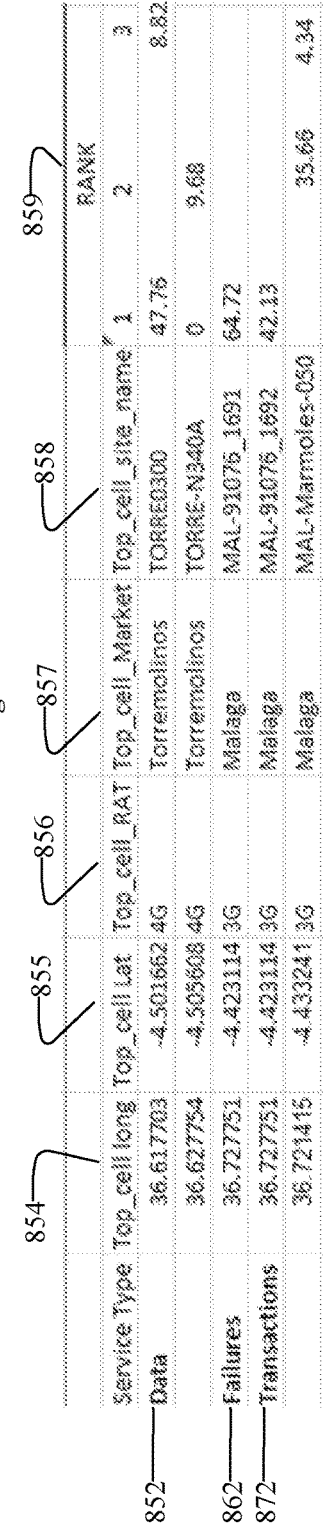
FIG. 8 illustrates the locality of usage with association to market, geo location and network access technology, showing example data displayed by a widget for top cell ranking that can rank a fixed or pseudo-fixed number of locations on which a certain activity was dispersed over a day (data, failures and transactions).
Figure 10:
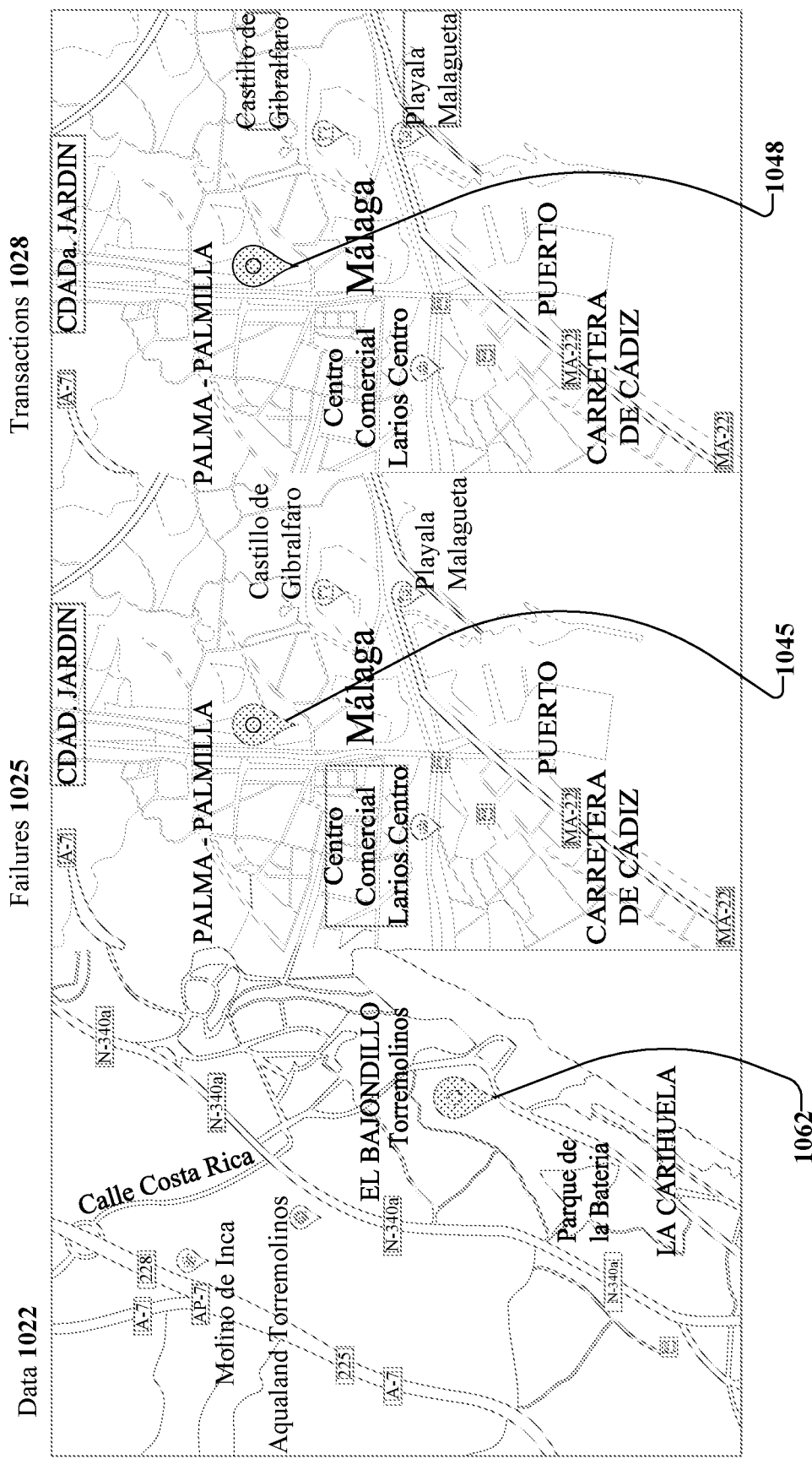
FIG. 10 illustrates examples of output from widgets for data dispersion maps, failure dispersion maps and transaction dispersion maps, which provide a geographical view of the top locations on which different user activities were dispersed.

FIG. 8 illustrates the locality of usage with association to market, geo location and network access technology, showing example data displayed by a widget for top cell ranking 554 that can rank a fixed or pseudo-fixed number of locations on which a certain activity was dispersed over a day (data, failures and transactions). In this example, the number of ranked locations 859 is three, in the right-hand columns of the table. There are more than three rows of data, because two of the locations had more than one cell. As the reader may recognize from the map in FIG. 10, shown later, these locations are illustrated as being in southern Spain. The three groups of lines are for data 852, failures 862 and transactions 872. For the operator's evaluation, columns of data provide include latitude 855 and longitude 854, radio access type (here, 4G or 3G) 856, cellular market 857 and cell site name 858. Two rows in the same group have different cell site names because there are multiple cell sites at a location. More significant are the top three locations. As shown by the data in FIG. 8, the individual user had two thirds of their data traffic over three cells, spread across two geographic locations (given by a unique latitude, longitude pair). In the columns, a market is an area, such as a city, that includes multiple cell sites. A cell site can include multiple cells at the same location. Two cells at the same location can be among the three top cells used, as indicated in the top line of FIG. 8, in which the cells ranked #1 and #3 for usage are in the same location row. The two top lines show that the user distributed 66 percent of his volume (47.76+8.82+9.68) on one day across 3 cells, physically residing at two geographic locations within the same market. He dispersed ~57% (47.76%+8.82%) of his volume for the day on the top location and 9.68% on the second one. In this example, the user activity is for a day. Activity also could be illustrated for a workweek, a calendar week, or multiple weeks. It could be illustrated for a month or quarter.

Figure 9:
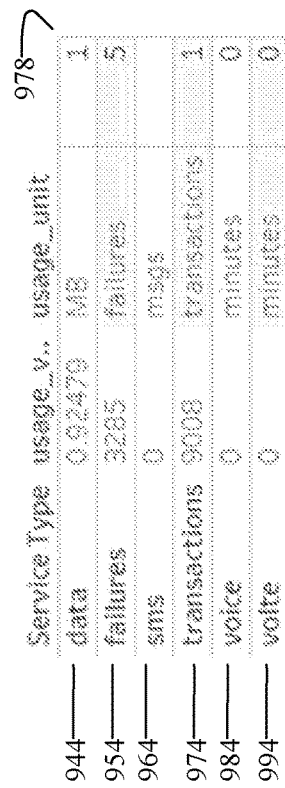
FIG. 9 illustrates a widget for service usage for profiling the services used in a day by the user, along with a measurement of their intensity. It also classifies the intensity of each service into a score ranging from 0 to 5 which gauges the intensity in relation to the entire user population.

FIG. 9 illustrates a widget for service usage 528 for profiling the services used in a day by the user, along with a measurement of their intensity. It also classifies the intensity of each service into a score ranging from 0 to 5 which gauges the intensity in relation to the entire user population. The table illustrated has rows for data 944, failures 954, SMS usage messages 964, transactions 974, voice minutes 984 and voice over LTE minutes 994. While the widget supports all of these statistics, the user illustrated did not have voice or SMS usage, so only the data related rows are populated. FIG. 9 continues the example shown in FIG. 7 and FIG. 8. The rightmost column 978 lists a usage score, which is a value of zero to five, indicating the intensity of usage relative to the entire user population. Data usage for this user was less than 1 MB, so the user has a low score for total data usage. The number of failures was high, "5", described as placing the user in the top 5% of user failure rates. The number of transactions was low relative to other subscribers, as this user only did data and used little volume. Although the user did not interact heavily with the network, he had a high rate of failure because his device repeatedly tried to register for voice services while it was only configured for data services.

FIG. 10 illustrates examples of output from widgets for data dispersion maps 1022, failure dispersion maps 1025 and transaction dispersion maps 1028, which provide a geographical view of the top locations on which different user activities were dispersed. The maps highlight differences in location preferences for different activity types. Locations can be much more intuitively recognized by customer care representatives looking at a map than by latitude and longitude. In this example, the data usage was mostly in one market (Torremolinos) 1062, while most of the transactions 1048 and failures 1045 were in a different market (Malaga). This map illustrates how activities differed between two primary camping locations.

Figure 11:
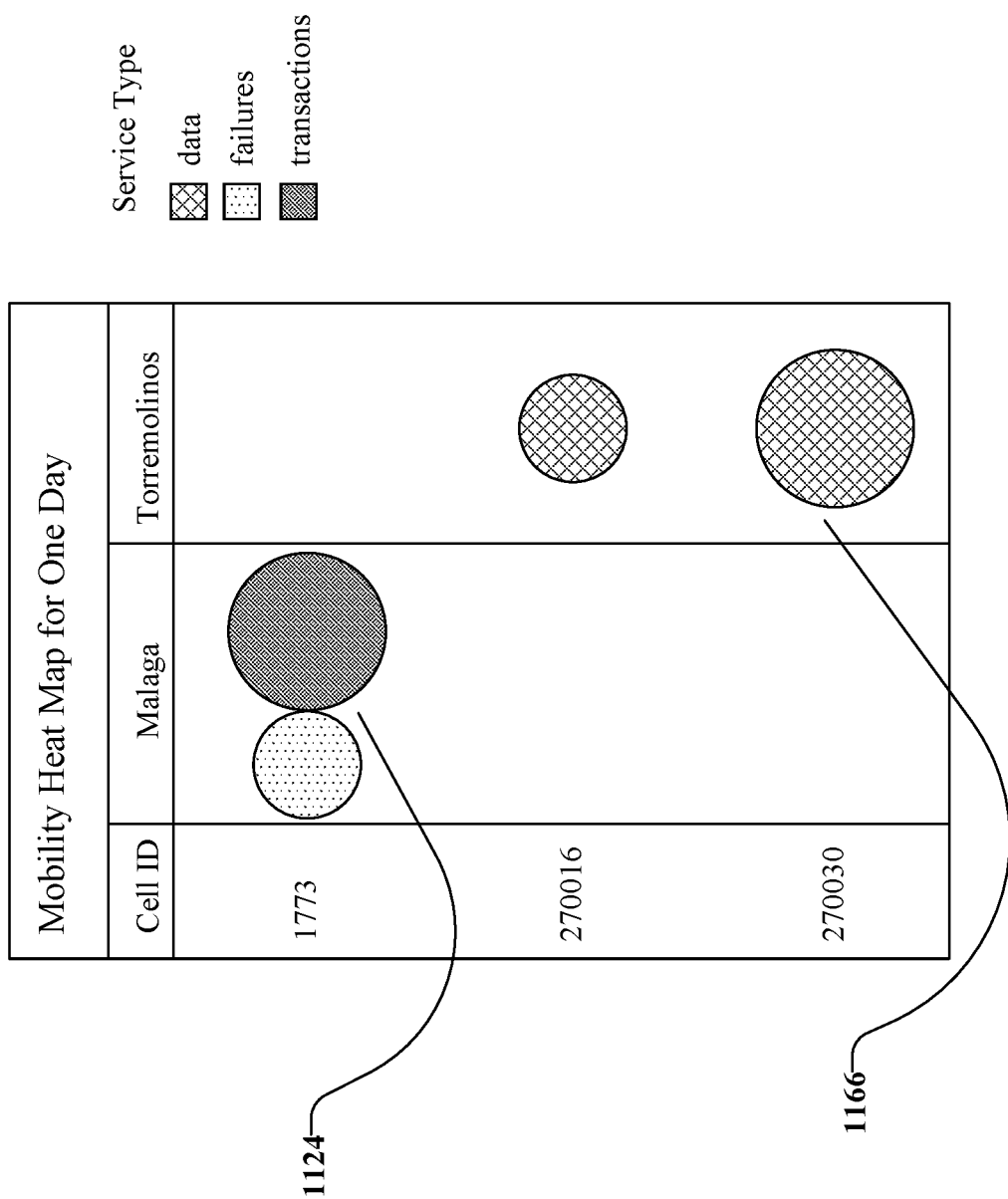
FIG. 11 illustrates one-day output of a widget for mobility dispersion heat map, which shows both the intensity and the locality of the different user activities.

FIG. 11 illustrates one-day output of a widget for mobility dispersion heat map 568, which shows both the intensity and the locality of the different user activities. Intensity is measured as the number of times the cell has appeared in the top three for that activity. Continuing the example of the earlier figures, this user dispersed most of their transactions and failures on a 3G cell (1773) in Malaga 1124. However, they dispersed most of their data in another market—Torremolinos 1166.

Figure 12A:
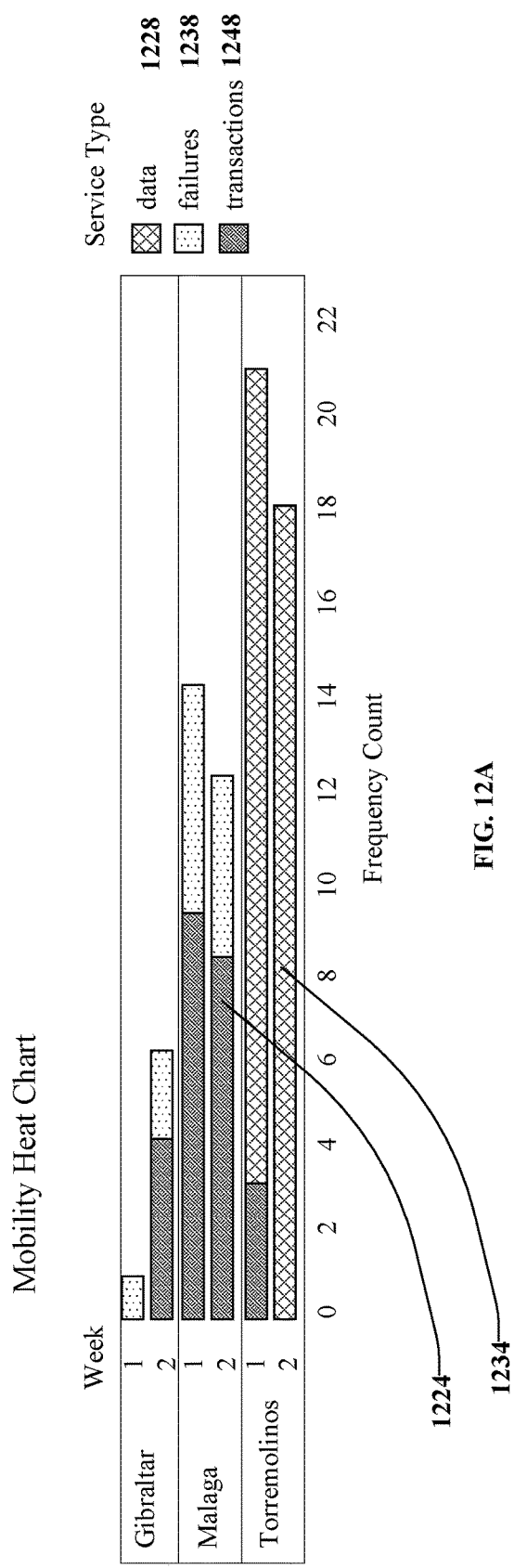
FIG. 12A illustrates two weeks of output of a widget for mobility dispersion heat map contrasting the two weeks.

FIG. 12A illustrates two weeks of output of a widget for mobility dispersion heat map contrasting the two weeks. As for FIG. 11 and the one-day output, intensity is measured as the number of times the cell has appeared in the top three for that activity Different patterns represent different service types. Here, the service types illustrated are for data 1228, failures 1238 and transactions 1248. Consistent with data expressed using widgets for dispersion maps 1022, 1025, 1028, most of the failures and transactions happened in one location—Malaga 1224, while data happened in a different location—Torremolinos 1234. In the horizontal stacked bar graph in the mobility heat chart, successive weeks appear as adjoining bars. Contrasting successive weeks, this user had more failures and transactions in week one than in week two. In both weeks, Torremolinos was the top data market.

Figure 12B:
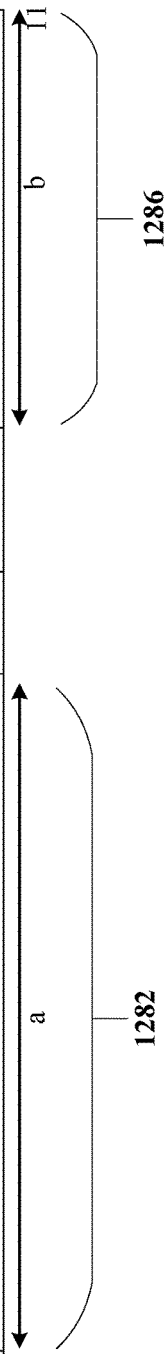
FIG. 12B illustrates differences in the organization of data for two weeks.

FIG. 12B illustrates differences in the organization of data for two weeks. More cells are called out in the bottom section of the display for two weeks. This can reveal different patterns between work days and days off. The two weeks are separately plotted, which can reveal changes in patterns between the weeks. Data usage was more dispersed in that market during week one 1282 than week two 1286.

FIG. 13 lists the top cause code for each service that failed and the number of failures observed for that cause code for one day, which confirms repeated efforts by the user equipment to connect the voice network, resulting in authorization failures. The first line of the table shows a data failure cause code with a single failure 1322. The second, voice line of the table shows 1644 failures related to authentication failure 1332, because the device was not authorized to use voice communications. Similar analysis and statistics could be supplied for one or two weeks, for a month or quarter.

In summary, key mobility insights for the sample user are generated and displayed via the widgets of the dashboard for mobility and dispersion analytics described relative to FIG. 5. Over one day, this user touched 128 cells, a large number, but did 97% of their data on just two cells in one location. 97% of transaction and failures were in one cell in Malaga. Their mobility varied two weeks, primarily impacting dispersion of transactions and failures across two markets. The identity of the top three camping locations is revealed in the figures described earlier. One can infer that the user lives in Torremolinos and works in Malaga. At home, the UE uses most of their 4G data. When at work, their device repeatedly attempts and fails to connect to the voice network. The dominant cause of voice failures is authentication failure. This could either result from device misconfiguration or a lack of subscription to voice services. A customer service agent who has this information at their fingertips can understand the user's behavior and provide good customer care. The agent can discern how the user's mobility has affected their interactions with the network at several different levels. Either a trained user care professional or an artificial intelligence system can recognize patterns in this data and proceed accordingly.

Computer System

FIG. 14 is a simplified block diagram of an embodiment of a system 1400 that can be used for analyzing and quantifying the mobility behavior of a mobile device user and their interactions with a serving cellular network, pinpointing cellular communication challenges encountered by a user equipment (UE) mobile device or a group of UE mobile devices. System 1400 can also be used for taking into account mobility behavior and interactions with a serving cellular network of a UE mobile device, and performing policy updates and RAN decisions for the UE mobile device based on the analysis.

Computer system 1410 typically includes a processor subsystem 1472 which communicates with a number of peripheral devices via bus subsystem 1450. These peripheral devices may include a storage subsystem 1426, comprising a memory subsystem 1422 and a file storage subsystem 1436, user interface input devices 1438, user interface output devices 1478, and a network interface subsystem 1476. The input and output devices allow user interaction with computer system 1410 and network and channel emulators. Network interface subsystem 1474 provides an interface to outside networks and devices of the system 1400. The computer system further includes communication network 1484 that can be used to communicate with user equipment (UE) units; for example, as a device under test.

The physical hardware component of network interfaces are sometimes referred to as network interface cards (NICs), although they need not be in the form of cards: for instance they could be in the form of integrated circuits (ICs) and connectors fitted directly onto a motherboard, or in the form of microcells fabricated on a single integrated circuit chip with other components of the computer system.

User interface input devices 1438 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 1410.

User interface output devices 1478 may include a display subsystem, a printer, a fax machine, or non-visual displays such as audio output devices. The display subsystem may include a cathode ray tube (CRT), a flat panel device such as a liquid crystal display (LCD) or LED device, a projection device, or some other mechanism for creating a visible image. The display subsystem may also provide non-visual display such as via audio output devices. In general, use of the term "output device" is intended to include all possible types of devices and ways to output information from computer system 1410 to the user or to another machine or computer system. The computer system further can include user interface output devices 1478 for communication with user equipment.

Storage subsystem 1426 stores the basic programming and data constructs that provide the functionality of certain embodiments of the present invention. For example, the various modules implementing the functionality of certain embodiments of the invention may be stored in a storage subsystem 1426. These software modules are generally executed by processor subsystem 1472.

Storage subsystem 1426 typically includes a number of memories including a main random access memory (RAM) 1434 for storage of instructions and data during program execution and a read only memory (ROM) 1432 in which fixed instructions are stored. File storage subsystem 1436 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs and may be stored by file storage subsystem 1436. The host memory storage subsystem 1426 contains, among other things, computer instructions which, when executed by the processor subsystem 1472, cause the computer system to operate or perform functions as described herein. As used herein, processes and software that are said to run in or on "the host" or "the computer", execute on the processor subsystem 1472 in response to computer instructions and data in the host memory storage subsystem 1426 including any other local or remote storage for such instructions and data.

Bus subsystem 1450 provides a mechanism for letting the various components and subsystems of computer system 1410 communicate with each other as intended. Although bus subsystem 1450 is shown schematically as a single bus, alternative embodiments of the bus subsystem may use multiple busses.

Computer system 1410 itself can be of varying types including a personal computer, a portable computer, a workstation, a computer terminal, a network computer, a television, a mainframe, or any other data processing system or user device. Due to the ever changing nature of computers and networks, the description of computer system 1410 depicted in FIG. 14 is intended only as a specific example for purposes of illustrating embodiments of the present invention. Many other configurations of computer system 1410 are possible having more or less components than the computer system depicted in FIG. 14.

Some Particular Implementations

Some particular implementations and features are described in the following paragraphs.

In one implementation, the disclosed technology includes a method of quantifying a mobility behavior of a user equipment (UE) mobile device and a device user's interactions with a serving cellular network, enabling determination of cellular communication challenges encountered with user equipment (UE). The disclosed method includes a network data analytics function (NWDAF) component, in communication with core network components of a cellular network, subscribing to receive notices that report changed or changing events, including a change in connectivity to any cell for any UE device and any service usage on the cell. This includes but is not limited to an SMS, voice call, surfing the web which result in changes in connectivity and service users on the cell. The disclosed method also includes analyzing the notices to determine dispersion indices when the UE mobile device changes its selection of a base station or a cell or a tracking area, its selection of a network slice, and reporting determined dispersion analysis results with an identifier of the UE mobile device involved. Dispersion analytics can also apply to cloud environments in which network functions are being handled by virtual agents and not physical ones.

This system and other implementations of the technology disclosed can include one or more of the following features and/or features described in connection with additional systems disclosed. In the interest of conciseness, the combinations of features disclosed in this application are not individually enumerated and are not repeated with each base set of features. The reader will understand how features identified in this section can readily be combined with sets of base features identified as implementations.

Some implementations of the disclosed method also include analyzing the notices to classify the UE mobile device as a fixed user, camper or traveler in an area of interest (abbreviated AOI).

For the disclosed methods, the dispersion indices are metrics that are applicable to any type of user activity performed on the network on its behalf, on at least one of a user plane and a control plane, regardless of activity state of the UE. The dispersion indices are at least one of a measure of how activity for the UE is dispersed and a measure of locations on which the UE has had a configurable quantity of activity.

For many implementations of the disclosed method, the dispersion index counts locations on which a UE or group of UEs have dispersed a configurable percentage of the total quantity of their data volume. The dispersion index counts locations on which the UE or group of UEs have spent most of their voice (talk) time. Additionally, for many implementations of the disclosed method, the dispersion index counts network slices on which a UE or group of UEs have dispersed a configurable percentage of the total quantity of their data volume. The dispersion index counts the network slices on which the UE or group of UEs have spent most of their data session activities.

For implementations of the disclosed method, services for which the dispersion indices are calculated include one or more of data, circuit switched voice, IMS based VoIP, VoLTE, 5GVoice, SMS, V2X, and video.

Some implementations of the disclosed method include calculating the dispersion indices with granularity by transaction type, wherein the transaction type is one or more of control plane transactions, application layer transactions, TCP set-up transactions, DNS exchange transactions, and application signaling transactions. In one disclosed implementation, the dispersion indices determined and reported include dispersion of transactions whose transaction outcome is a failure. In some disclosed implementations, the dispersion indices determined and reported include dispersion of transactions specific to a service usage on the cellular network. In other implementations of the disclosed method, the dispersion indices determined and reported include dispersion of transactions whose transaction outcome is a failure of one or more of the failure types: authentication failures for access to the network, service set-up failures, SMS delivery failures, voice origination failure, voice termination failure, DNS failure, TCP sync failure, connect failure. Dispersion indices are also calculated for dispersed data and dispersed voice minutes including circuit switch, IMS based VoIP, VoLTE and 5GVoice.

A variety of types of failures and transactions are usable to precompute dispersion indices. Continuous summarization offers one level of detail. More granular summarization can be applied. Anticipated ongoing summarization is motivated by the huge amounts of data, which is typically maintained for up to seven days, and can be stored for as little as 48 hours in some systems. In one example, the TCP setup is a transaction. The data model does not distinguish among layer transactions. DNS exchanges can also be considered as transactions. Transactions can include control plane as well as application layer transactions.

For some implementations of the disclosed method, the dispersion indices determined and reported include dispersion of dropped sessions, including one or more of dropped calls, network-initiated drops, UE initiated drops, unintended drops and coverage drops.

For some implementations of the disclosed method, the dispersion indices are applied to locations of different physical granularity, including one of geographic locations, cells or cell-sector-carriers, of logical scope such as 5G network slices, and of virtual scope such as virtual network functions in a cloud-hosted environment.

In one implementation of the disclosed method, the UE mobile device is analyzed in a test environment and signals from at least two base stations or cells are supplied to the UE mobile device by a channel emulator in the test environment. In other implementations of the disclosed method, the UE mobile device is analyzed in a live network environment and the UE mobile device belongs to a customer of an operator of the live network.

Some implementations of the disclosed technology are further applied to a group of UE mobile devices selected for analysis, that can be device based, geographically based, affinity based, or on any other basis selected by a user or network operator and the dispersion indices capture the collective activity of the group. One disclosed implementation further includes assigning UE mobile devices in the group to classes and reporting analytics on group behavior for the classes.

The dispersion indices capture the collective activity of the group, for identifying hotspots in the network handling a significant amount of activity for the group and other groups as well. Some implementations further include identifying hotspots in the network handling a significant amount of activity for multiple groups using dispersion indices of UEs or groups of UEs.

Some implementations of the disclosed technology include the NWDAF subscribing to notices within an operator defined tracking area.

For other implementations of the disclosed technology, the reporting of dispersion analytics can happen in near real time. The solution is enhanced by real time reporting. In some use cases, a postmortem analysis is beneficial for the operator for determining ongoing improvements for the network.

Some implementations of the disclosed technology further include assigning the UE mobile device to a class based on its rate of motion and analyzing collective behavior of UEs belonging to the class. Other implementations further include assigning the UE mobile device to a class based on the device being stationary and analyzing collective behavior of UEs belonging to the class. One implementation further includes configuring the UE mobile device as a stationary device and assigning the UE mobile device to a class based on the device being stationary and analyzing collective behavior of UEs belonging to the class.

In one implementation, the disclosed technology includes a method of taking into account mobility behavior and interactions with a serving cellular network of a user equipment (UE) mobile device, when determining network interaction parameters for the UE mobile device. The disclosed method includes providing an identifier of the UE mobile device to a network data analytics function (NWDAF) component that subscribes to receive notices that report changed or changing events, including a change in connectivity to any cell for any UE mobile device and any service usage on the cell and performs a dispersion analysis by analyzing the notices to determine dispersion indices as the UE mobile device changes its selection of a base station or a cell or a tracking area. The method also includes receiving the dispersion analysis for the UE mobile device, and performing a policy update and/or a radio access network (RAN) decision for the UE mobile device based on at least the dispersion analysis. Interactions can include the dispersed volume at an AOI or slice.

In one implementation of the disclosed method, the dispersion indices include a measure of whether the UE mobile device is a fixed user, camper or traveler in an area of interest (AOI) during a predetermined or provided time window. For some implementations, the dispersion indices include data volume dispersion and transaction volume dispersion. In some cases dispersion indices include a measure of whether the UE mobile device is a heavy user or infrequent user.

Some implementations of the disclosed technology further include receiving interaction data, including historical usage volume, with the dispersion analysis and using the interaction data when performing the policy update and/or the RAN decision. Some further include receiving the interaction data for historical data usage volume, historical voice minutes and historical sum of transaction usage.

One implementation of the disclosed method further includes performing the policy update by changing slice selection option, slice instance, restricting area of service, and/or changing or removing quality of service (QoS) attributes for an upcoming or ongoing session.

One implementation of the disclosed method further includes performing the policy update by slice or slice instance selection for an upcoming or ongoing session. Another implementation includes performing the policy update by restricting area of service for an upcoming or ongoing session. Yet another implementation includes performing the policy update by changing or removing quality of service (QoS) attributes for an ongoing session.

Some implementations of the disclosed method include performing the RAN decision by spectrum selection, Radio Access Technology (RAT) selection and/or area restriction for an upcoming or ongoing session. One implementation of the disclosed method includes performing the RAN decision by spectrum selection for an upcoming or ongoing session. Another implementation further includes performing the RAN decision by Radio Access Technology (RAT) selection for an upcoming session. Yet another implementation of the disclosed method includes performing the RAN decision by area restriction for an upcoming or ongoing session.

Other implementations include tangible non-transitory computer readable storage medium loaded with program instructions executed on processors to implement a method as described above. A tangible non-transitory computer readable medium does not include a transitory wave form.

Some implementations may include a system for taking into account mobility behavior and interactions with a serving cellular network of a user equipment (UE) mobile device, when determining network interaction parameters for the UE mobile device, the system including a processor, memory coupled to the processor and configured with computer instructions from the non-transitory computer readable storage media loaded into the memory, according to the preceding computer readable media, described above.

Yet other implementations may include a system for quantifying the mobility behavior of a mobile device user and their interactions with a serving cellular network, enabling the determination of cellular communication challenges encountered by their UE, the system including a processor, memory coupled to the processor and configured with computer instructions from the non-transitory computer readable storage media loaded into the memory, according to the preceding computer readable media, described above.

We claim as follows:

1. A method of quantifying a mobility behavior of a user equipment (UE) mobile device and a device user's interactions with a serving cellular network, enabling determination of cellular communication challenges encountered with user equipment (UE), including:
   a network data analytics function (NWDAF) component, in communication with core network components of a cellular network, subscribing to receive notices that report changed or changing events, including a change in connectivity to any cell for any UE device and any service usage on the cell;
   analyzing the notices to determine dispersion indices as the UE mobile device changes its selection of a base station or a cell or a tracking area; and
   reporting determined dispersion analysis results with an identifier of the UE mobile device involved.

2. The method of claim 1, further including analyzing the notices to classify the UE mobile device as a fixed user, camper or traveler in an area of interest (AOI).

3. The method of claim 1, wherein the dispersion indices are metrics that are applicable to any type of user activity performed on the network on its behalf, on at least one of a user plane and a control plane, regardless of activity state of the UE.

4. The method of claim 1, wherein the dispersion indices are at least one of a measure of how activity for the UE is dispersed and a measure of locations on which the UE has had a configurable quantity of activity.

5. The method of claim 1, wherein the dispersion index counts locations on which a UE or group of UEs have dispersed a configurable percentage of total quantity of their data volume.

6. The method of claim 1, wherein services for which the dispersion indices are calculated include one or more of data, circuit switched voice, IMS based VoIP, VoLTE, and 5GVoice.

7. The method of claim 1, wherein the dispersion indices determined and reported include dispersion of transactions whose transaction outcome is a failure.

8. The method of claim 1, wherein the dispersion indices determined and reported include dispersion of dropped sessions, including one or more of dropped calls, network-initiated drops, UE initiated drops, unintended drops and coverage drops.

9. The method of claim 1, further applied to a group of UE mobile devices selected for analysis, that is at least one of device based, geographically based, and affinity based; and the dispersion indices capture collective activity of the group.

10. The method of claim 9 wherein the dispersion indices capture collective activity of the group, for identifying hotspots in the network handling a significant amount of activity for the group.

11. The method of claim 9, further including identifying hotspots in the network handling a significant amount of activity for multiple groups using the dispersion indices.

12. The method of claim 1, wherein the dispersion indices are applied to locations of different physical granularity, including one of geographic locations, cells or cell-sector-carriers, of logical scope such as 5G network slices, and of virtual scope such as virtual network functions in a cloud-hosted environment.

13. A tangible non-transitory computer readable storage medium impressed with computer program instructions that, when executed on a processor, cause the processor to implement actions that quantify a mobility behavior of a user equipment (UE) mobile device and a device user's interactions with a serving cellular network, enabling determination of cellular communication challenges encountered with user equipment (UE), including:
   a network data analytics function (NWDAF) component, in communication with core network components of a cellular network, subscribing to receive notices that report changed or changing events, including a change in connectivity to any cell for any UE device and any service usage on the cell;
   analyzing the notices to determine dispersion indices as the UE mobile device changes its selection of a base station or a cell or a tracking area; and
   reporting determined dispersion analysis results with an identifier of the UE mobile device involved.

14. The tangible non-transitory computer readable storage medium of claim 13, further impressed with computer program instructions wherein the dispersion index counts locations on which a UE or group of UEs have dispersed a configurable percentage of total quantity of their data volume.

15. The tangible non-transitory computer readable storage medium of claim 13, further impressed with computer program instructions that implement analyzing the notices to classify the UE mobile device as a fixed user, camper or traveler in an area of interest (AOI).

16. The tangible non-transitory computer readable storage medium of claim 13, further impressed with computer program instructions wherein the dispersion index counts locations on which the UE or group of UEs have spent most of their voice call minutes.

17. The tangible non-transitory computer readable storage medium of claim 13, further impressed with computer program instructions wherein the dispersion indices determined and reported include dispersion of transactions specific to a service usage on the cellular network.

18. The tangible non-transitory computer readable storage medium of claim 13, further impressed with computer program instructions wherein the dispersion indices determined and reported include dispersion of transactions whose transaction outcome is a failure of one or more of the failure types: authentication failures for access to the network, service set-up failures, SMS delivery failures, voice origination failure, voice termination failure, DNS failure, TCP sync failure and connect failure.

19. A system including one or more processors coupled to memory, the memory loaded with computer instructions that, when executed on the processors, quantify a mobility behavior of a user equipment (UE) mobile device and a device user's interactions with a serving cellular network, enabling determination of cellular communication challenges encountered with user equipment (UE), the instructions, when executed on the processors, implement actions comprising:

a network data analytics function (NWDAF) component, in communication with core network components of a cellular network, subscribing to receive notices that report changed or changing events, including a change in connectivity to any cell for any UE device and any service usage on the cell;

analyzing the notices to determine dispersion indices as the UE mobile device changes its selection of a base station or a cell or a tracking area; and reporting determined dispersion analysis results with an identifier of the UE mobile device involved.

20. The system of claim 19, further impressed with computer program instructions that implement analyzing the notices to classify the UE mobile device as a fixed user, camper or traveler in an area of interest (AOI).

21. The system of claim 19, wherein the dispersion indices determined and reported include dispersion of transactions whose transaction outcome is a failure.

22. The system of claim 19, wherein the dispersion indices determined and reported include dispersion of dropped sessions, including one or more of dropped calls, network-initiated drops, UE initiated drops, unintended drops and coverage drops.

* * * * *